United States Patent
Furukawa et al.

(10) Patent No.: US 6,906,832 B2
(45) Date of Patent: Jun. 14, 2005

(54) IMAGE FORMING APPARATUS WITH FUNCTION OF TILT ADJUSTMENT TO LASER-BEAM REFLECTING MIRROR

(75) Inventors: Kimiaki Furukawa, Kawasaki (JP); Toshiaki Tanaka, Fukaya (JP)

(73) Assignees: Kabushiki Kaisha Toshiba, Tokyo (JP); Toshiba TEC Kabushiki Kaisha, Tokyo (JP)

(*) Notice: Subject to any disclaimer, the term of this patent is extended or adjusted under 35 U.S.C. 154(b) by 934 days.

(21) Appl. No.: 09/812,953

(22) Filed: Mar. 27, 2001

(65) Prior Publication Data

US 2002/0140953 A1 Oct. 3, 2002

(51) Int. Cl.⁷ .................................................. H04N 1/04
(52) U.S. Cl. ........................ 358/480; 358/475; 358/497; 359/204; 359/205; 359/212; 382/295; 382/286; 382/289; 360/75; 347/243; 347/244
(58) Field of Search ................................ 358/480, 401, 358/475, 497, 2.1; 360/75; 347/243, 244, 116, 234; 382/295–298, 293, 289, 305, 286; 345/649

(56) References Cited

U.S. PATENT DOCUMENTS 5,751,462 A * 5/1998 Shiraishi et al. ............ 359/204
5,995,717 A    11/1999 Tanaka ........................ 395/109
6,075,638 A *  6/2000 Masuda ....................... 359/206

FOREIGN PATENT DOCUMENTS

| JP | 10-278338 | 10/1998 |
| JP | 11-352744 | 12/1999 |

* cited by examiner

Primary Examiner—Edward Coles
Assistant Examiner—Heather D. Gibbs
(74) Attorney, Agent, or Firm—Foley & Lardner LLP

(57) ABSTRACT

An image forming apparatus has functions of tilt adjustments to a mirror for reflecting a laser beam and outputting an image after registration of a plurality of images. The apparatus includes a laser source for generating laser beams, a plurality of mirrors for reflecting a plurality of light beams including at least one reference beam for forming the images based on the laser beams generated by the laser source, an image forming unit for forming the images for each of the light beams, an image transfer unit for storing the images formed by the image forming unit and transferring the stored images in a predetermined sub-scanning direction, an inclination detecting section for detecting inclinations of the images stored by the image transfer unit in a main-scanning direction in relation to the sub-scanning direction at least on the reference beam, and an inclination correcting section for correcting the inclinations detected by the inclination detecting section on the reference beam in the main-scanning direction by adjusting a relative angle of the mirror for reflecting the reference beam in the main-scanning direction.

22 Claims, 20 Drawing Sheets

IMAGE FORMING APPARATUS WITH FUNCTION OF TILT ADJUSTMENT TO LASER-BEAM REFLECTING MIRROR

BACKGROUND OF THE INVENTION

The present invention relates to an image forming apparatus for example a plane paper copy machine (called PPC hereinafter) or a printer that prints out data from an image data supplying apparatus such as a personal computer (called PC hereinafter) or a digital camera on regular sheets or OHP sheets. Particularly, this invention relates to an image forming apparatus having a function of tilt adjustment to a mirror that reflects or send backs laser beams for reading image data on documents.

Four-tandem color-image forming apparatus have a drawback in which distortion will be generated on a formed images due to the fact that a scanning angle of scanning beams generated by an exposure device in a sub-scanning beam direction is not perpendicular (called perpendicularity deviation hereinafter) to a conveying direction in which a transfer belt conveys a medium (a sheet or an intermediate transfer body) on which an image is formed. In detail, distortion will be generated such that lines or rows of characters formed along the sides on both ends of a sheet on which an image has been formed orthogonal to lines along the two sides positioned on both sides in a conveying direction are not orthogonal thereto. This results in that rows of characters parallel to each other along closing lines of a table or on an image are formed as slanting to a direction that is orthogonal to a sheet-transfer direction.

Perpendicularity deviation described above in which a main-scanning beam and a sub-scanning beam are not perpendicular to each other is corrected by adjusting an exposure device when assembling so that it is perpendicular to a main frame of an image forming apparatus. An exposure device in 4-tandem system is provided with four laser-beam reflecting mirrors. The mirrors are adjusted for parallelism in a reflecting direction to cancel angular deviation of the mirrors in the exposure device before accurately positioning the device and an image forming medium in the main frame for accurate setting of a image forming direction so that an image to be formed as perpendicular to a medium-conveying direction is formed as such.

The perpendicularity in a main-scanning direction to the conveying direction in a known image forming apparatus is not accurately maintained but varying during periodical replacement of a belt or laser exposure device. Perpendicularity adjustments take an extremely long time because the positional relationship of an exposure device to the medium-conveying direction is re-adjusted after the image forming apparatus is deassembled. Errors occurring in regular use such as perpendicularity or parallelism deviation in a reference color-light beam that has been adjusted only in relation to the exposure device as a reference when the exposure device is installed in a main frame of a printing apparatus are allowed as inevitable errors.

The known exposure device is equipped with a follow-up adjusting means for minimizing such errors. The image forming apparatus is assembled while the exposure device is adjusted by the adjusting means so that it is perpendicular to a conveying direction for the transfer belt. The positional relationship, however, varies during periodical replacement of a belt or laser exposure device. The correction of positional verification takes an extremely long time even though the follow-up Adjusting means is used.

Moreover, the reflecting mirror for sending back a reference color is fixed after its angle is adjusted during unit assembling. Registration adjustment control for other (color) images in the main frame thus could degrade the fθ-characteristics for light beams from other mirrors. The fθ-characteristics means linearity of a scanning light beam to a converging point in a range of effective scanning width for the light beam. Forced slant adjustments to light beams in relation to a error-carrying light beam as a reference while a reference light beam has not been adjusted with no optimum slanting results in mirror-tilt adjustments in which a light path is set inappropriately according to the fθ-characteristics. This causes a problem in image registration in the main-scanning direction such that images are mostly mis-positioned on the center in the allowable scanning width while there is no mis-registration on both sides in the effective scanning width at which mis-registration in the main-scanning direction is detected by a correcting system.

SUMMARY OF THE INVENTION

A purpose of the present invention is to provide an image forming apparatus for easy correction of image inclination by adjustment to a reference light beam in a main-scanning direction so that it is accurately orthogonal to an image forming medium-conveying direction and positioning of other light beams in the main-scanning direction based on the reference light beam.

To attain the purpose, an image forming apparatus according to a first aspect of the present invention and the basis thereof has functions of tilt adjustments to a mirror for reflecting a laser beam and outputting an image after registration of a plurality of images, the apparatus comprising: a laser source for generating laser beams; a plurality of mirrors for reflecting a plurality of light beams including at least one reference beam for forming the images based on the laser beams generated by the laser source; image forming means for forming the images for each of the light beams; image transfer means for storing the images formed by the image forming means and transferring the stored images in a predetermined sub-scanning direction; inclination detecting means for detecting inclinations of the images stored by the image transfer means in a main-scanning direction in relation to the sub-scanning direction at least on the reference beam; and inclination correcting means for correcting the inclinations detected by the inclination detecting means on the reference beam in the main-scanning direction by adjusting a relative angle of the mirror for reflecting the reference beam in the main-scanning direction.

In the first aspect of the image forming apparatus, according to a second aspect of the present invention, the inclination detecting means detects inclinations of the light beams other than the reference beam in the main-scanning direction in addition to the detection of the inclinations of the reference beam in the main-scanning direction, and the inclination correcting means corrects the inclinations of the images in the main-scanning direction formed by the light beams other than the reference beam by adjusting relative angles of mirror for reflecting the light beams other than the reference beam in the main-scanning direction.

In the second aspect of the image forming apparatus, according to a third aspect of the present invention, the inclination detecting means includes a plurality of detectors provided as being apart from each other by a predetermined distance within an allowable scanning range in a scanning direction of the light beams for detecting the inclinations of the reference beam and the light beams other than the reference beam in the main-scanning direction, and the inclination correcting means converts the inclinations in the scanning direction in relation to the sub-scanning direction into signal values based on virtual straight lines for determination that connect a plurality of positions detected by the detectors, and compares the detected signal values with a reference signal value predetermined based on a main-scanning light beam orthogonal to the sub-scanning direction, thus not making correction when signal differences lie in an allowable range whereas making correction when the signal differences exceed the allowable range.

In the third aspect of the image forming apparatus, according to a fourth aspect of the present invention, the image forming means forms predetermined marks at positions at least detectable by the detectors in the images stored in the image transfer means, the detectors of the inclination detecting means detect the marks formed at the predetermined positions in the images for detection of the detectable positions, and the inclination correcting means forms the virtual straight lines for determination by connecting the detected positions and performs the comparison as to whether or not the inclinations lie in the allowable range for correction of the inclinations.

In the second aspect of the image forming apparatus, according to a fifth aspect of the present invention, the inclination correcting means has a function of preventing decrease in fθ-characteristics indicating linearity of a position at which scanning light beams are converged within an allowable scanning range, the decrease occurring based on the correction of the inclinations of the light beams in the main-scanning direction, the inclination detecting means has an error detector for detecting an error of the fθ-characteristics by using detected amounts of image mis-positioning, and the inclination correcting means has a calculating section for calculating a feed-back amount for correction based on the error of the fθ-characteristics detected by the error detector and an adjusting section, responsive to the feed-back amount for correction calculated by the calculating section, for adjusting the amounts of image mis-positioning detected based on the error of the fθ-characteristics.

In the fifth aspect of the image forming apparatus, according to a sixth aspect of the present invention, the calculating section calculates the feed-back amount for correction to correct perpendicularity in the main-scanning direction in relation to the sub-scanning direction, incorrect perpendicularity being a cause of occurrence of a big error to the fθ-characteristics, and the adjusting section adjusts a slant of the reflecting mirror in the main-scanning direction based on the feed-back amount for correction while applying correction of the error of the fθ-characteristics.

In the fifth aspect of the image forming apparatus, according to a seventh aspect of the present invention, the inclination detecting means includes a plurality of detectors provided as being apart from each other by a predetermined distance within an allowable scanning range in a scanning direction of the light beams for detecting the inclinations of the reference beam and the light beams other than the reference beam in the main-scanning direction, the detectors having an error detecting function of detecting an error of the fθ-characteristics by using detected amounts of image mis-positioning, and the inclination correcting means has a calculating section for calculating a feed-back amount for correction based on the error of the fθ-characteristics detected by the error detector, an adjusting section, responsive to the feed-back amount for correction calculated by the calculating section, for adjusting the amounts of image mis-positioning detected based on the error of the fθ-characteristics in an allowable range, a signal converter for converting the inclinations in the scanning direction in relation to the sub-scanning direction into signal values based on virtual straight lines for determination that connect a plurality of positions detected by the detectors, a comparing section for comparing the detected signal values with a reference signal value predetermined based on a main-scanning light beam orthogonal to the sub-scanning direction and an adjusting section for correcting the inclination so that differences in the signals lie in the allowable range.

In the fifth aspect of the image forming apparatus, according to an eighth aspect of the present invention, the inclination detecting means includes a plurality of detectors provided as being apart from each other by a predetermined distance within an allowable scanning range in a scanning direction of the light beams for detecting the inclinations of the reference beam ans the light beams other than the reference beam in the main-scanning direction, the detectors having an error detecting function of detecting an error of the fθ-characteristics by using detected amounts of image mis-positioning, and the calculating section of the inclination correcting means accepts the error of the fθ-characteristics as image mis-registration in the main-scanning direction detected by the detectors as a plurality of detected values and performs averaging processing such that absolute values of the accepted detected values are averaged so that the absolute values of amounts of mis-registration lie in the allowable range.

In the first aspect of the image forming apparatus, according to a ninth aspect of the present invention, the inclination correcting means includes a first correction amount calculator for calculating the slant of the mirror for reflecting the reference beam in the main-scanning direction in relation to the sub-scanning direction based on a target value in the sub-scanning direction and outputting a correction value for the calculated slant as a correction control signal, and a first adjuster provided at one end of each mirror, the other end thereof being rotatably supported, for adjusting each mirror to rotate so that perpendicularity of each mirror in the main-scanning direction in relation to the sub-scanning direction is maintained based on the correction control signal from the correction amount calculator.

In the ninth aspect of the image forming apparatus, according to a tenth aspect of the present invention, the first adjuster is made up of manual adjusting means, attached to the mirror for reflecting the reference beam, for manually adjusting an angle of the mirror for reflecting the reference beam to be supported.

In the ninth aspect of the image forming apparatus, according to an eleventh aspect of the present invention, the first adjuster is made up of automatic adjusting means, attached to the mirror for reflecting the reference beam, for automatically adjusting an angle of the mirror for reflecting the reference beam to be supported based on pre-detected amount to be adjusted.

In the ninth aspect of the image forming apparatus, according to a twelfth aspect of the present invention, the first adjuster adjusts the reference beam by adjusting one of the mirrors provided as most distant from a laser generator or a polygon mirror as the laser source.

In the ninth aspect of the image forming apparatus, according to a thirteenth aspect of the present invention, the inclination correcting means includes a plurality of second correction amount calculators each for calculating a slant of each mirror for reflecting the light beam other then the reference beam in the main-scanning direction in relation to the reference beam detected by the inclination detecting means based on a detected value of the reference beam and outputting a correction value for the calculated slant as a correction control signal, and a plurality of second adjusters each provided at one end of each mirror, the other end thereof being rotatably supported, for adjusting each mirror to rotate so that perpendicularity of each mirror in the main-scanning direction in relation to the sub-scanning direction is maintained based on the correction control signal from the correction amount calculator.

In the thirteenth aspect of the image forming apparatus, according to a fourteenth aspect of the present invention, each second adjuster periodically adjusts the inclination of each light beams other than the reference beam in a predetermined timing after power in on, and the first adjuster adjusts the inclination of the reference beam during a regular maintenance including change of photosensitive drams, which an interval between periodical adjustments made by the first adjuster being longer in time than the periodical adjustments made by each second adjuster.

In the first aspect of the image forming apparatus, according to a fifteenth aspect of the present invention, the inclination detecting means is made up of self-printing means as pre-installed specific pattern images composed of blocks and grids and for printing the pattern images for visual inspection.

In the fifteenth aspect of the image forming apparatus, according to a sixteenth aspect of the present invention, each specific pattern image as the self-printing means is a pattern of grid of lines crossing vertically and horizontally and having scale marks formed with a specific color and distant from each other by a predetermined gap on lines connecting crossing points to be detected on the grid, for recognizing mis-positioning in the main and sub-scanning directions by checking the scale marks.

In the fifteenth aspect of the image forming apparatus, according to a seventeenth aspect of the present invention, each specific pattern image as the self-printing means is composed of a first line that lies in a first direction in the main or sub-scanning direction according a reference color, a second line that lies in a second direction perpendicular to the first line, a third line of another color that crosses with the first and the second lines at an acute angle, and a plurality of fourth lines of reference color parallel to the second line and formed with a predetermined gap, lines as the third line of the other color being formed as shifted from the first and the second lines when image mis-registration occurs, the shifting being expressed with enlargement as shifting in the second direction in accordance with shifting in the first direction, the shifting in the first direction being detectable according to the number of lines shifted from the first line in the first line as a reference and in the vicinity of the crossing with the second line in the second direction.

In the first aspect of the image forming apparatus, according to an eighteenth aspect of the present invention, the inclination detection means includes an end mis-positioning sensor provided at both ends in the main-scanning direction and a center mis-positioning sensor provided in the center in the main-scanning direction.

In the eighteenth aspect of the image forming apparatus, according to a nineteenth aspect of the present invention, the end mis-positioning sensor includes a plurality of first sensors fixed at the both ends in the main-scanning direction for detecting mis-positioning of images at the both ends in the main-scanning direction and a second sensor provided in the center in the in the main-scanning direction for detecting mis-positioning of an image at the center in the main-scanning direction.

In the eighteenth aspect of the image forming apparatus, according to a twentieth aspect of the present invention, the end mis-positioning sensor includes a first sensor fixed at one end in the main-scanning direction for detecting mis-positioning of an image at the one end in the main-scanning direction and a second sensor provided as movable between another end and the center both in the main-scanning direction for detecting mis-positioning of an image between the other end and the center in the main-scanning direction.

In the twentieth aspect of the image forming apparatus, according to a twenty-first aspect of the present invention, the second sensor includes a detecting section for detecting an image pattern reflected from an object image, a drive section on which the detecting section is mounted for moving the detecting section in the main-scanning direction and a positioning section for setting detection of the detecting section in accordance with a first fixed point at the other end in the main-scanning direction and a second fixed point at the center in the main-scanning direction.

In the twentieth aspect, the image forming apparatus according to a twenty-second aspect of the present invention further comprising: forming means for forming marks used for detecting mis-positioning in the main-scanning direction; and detecting means for detecting the marks and obtaining an amount of mis-positioning according to a sequence different from regular correction control, wherein the forming and the detecting means are provided in addition to a regular correction controller for correcting mis-positioning in both the main and the sub-scanning directions.

DETAILED DESCRIPTION OF PREFERRED EMBODIMENTS

Preferred embodiments of an image forming apparatus according to the present invention will be disclosed with reference to the attached drawings.

Figure 1A:
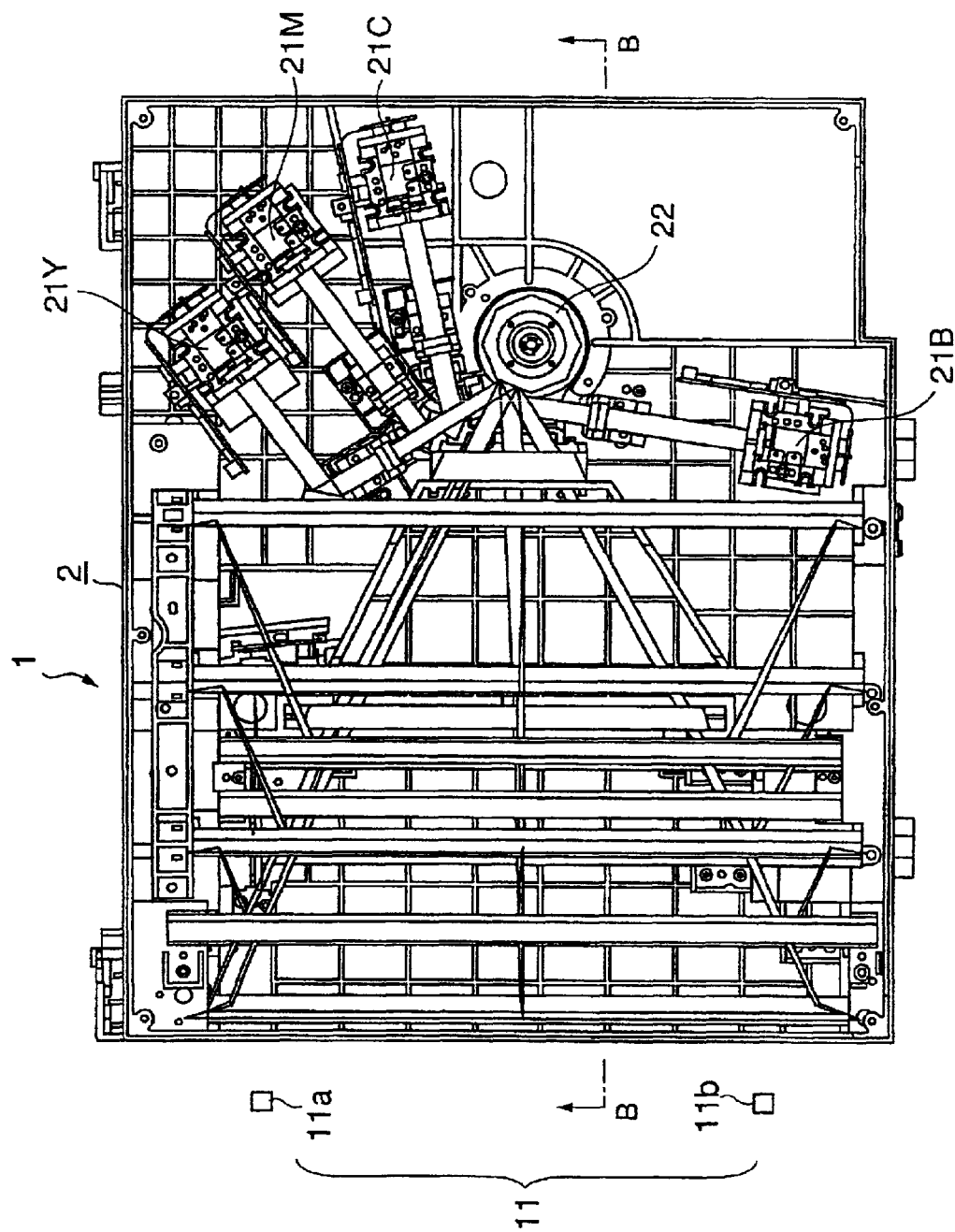
FIG. 1A is plan view showing a structure of a laser optical mechanism of an image forming apparatus according to a preferred embodiment of the present invention.
Figure 1B:
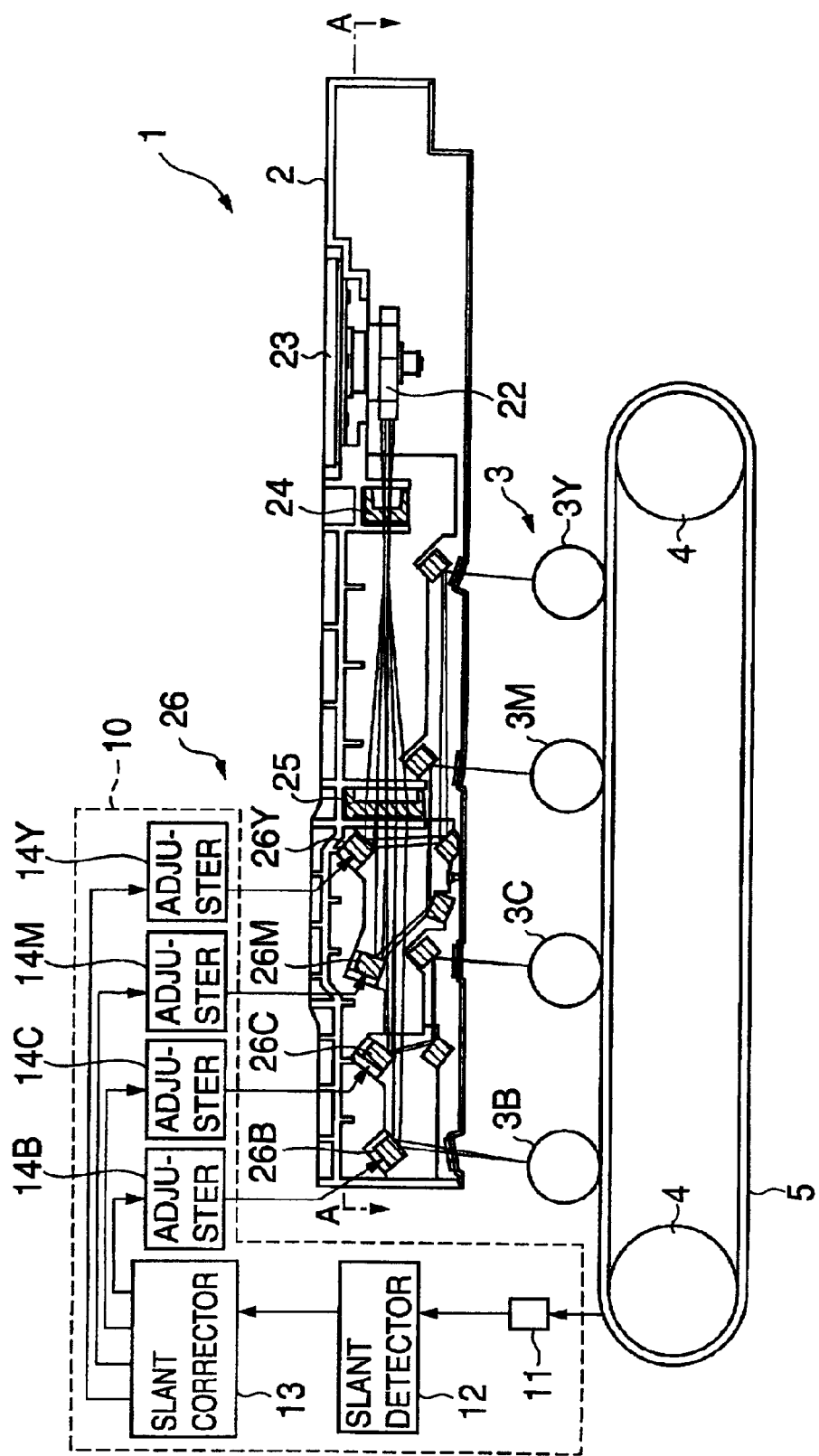
FIG. 1B is a sectional view taken along the line B—B in FIG. 1A.

A schematic structure of a 4-tandem color-image forming apparatus is explained with respect to FIGS. 1A and 1B. FIG. 1A is a plan view showing an exposure device 2 and a photosensitive drum unit 3 of an image forming apparatus 1. FIG. 1B is a front sectional view taken on line B—B of FIG. 1A and showing a transfer belt-driving roller 4, a transfer belt 5 and a correction control unit 10 for detecting an amount of mis-registration of an image formed on the transfer belt 5 to correct an angle of light beam radiated from the exposure device 2 to the photosensitive drum unit 3.

The exposure device 2 in FIG. 1A is provided with a laser 21Y for emitting a laser beam for yellow, a laser 21M for emitting a laser beam for magenta, a laser 21C for emitting a laser beam for cyan, and a laser 21B for emitting a laser beam for black and a polygonal mirror 22 for supplying the laser beams emitted by the lasers 21Y, 21M, 21C and 21B in a specific direction.

A detailed structure of the exposure device 2 is explained with reference to FIG. 1B. the polygonal mirror 22 is rotated by a polygon motor 23 to control the scanning laser beams emitted by the lasers 21Y, 21M, 21C and 21B. The laser beams reflected by the polygonal mirror 22 are adjusted for their linearity on a converging point in a range of effective scanning width while passing through a first fθ lens 24 and a second fθ lens 25 before guided onto a mirror 26. The mirror 26 consists of a mirror 26Y for reflecting a yellow beam, a mirror 26M for reflecting a magenta beam, a mirror 26C for reflecting a cyan beam and a mirror 26B for reflecting a black beam. The mirror 26 supplies respective color images to the corresponding photosensitive drums 3Y, 3M, 3C and 3B of the photosensitive drum unit 3.

Although not shown, toner containers for respective colors are provided in the vicinity of the photosensitive drums 3Y, 3M, 3C and 3B for respective colors. Toner is attached to the image formed on each photosensitive drum by electrostatic attachment. Each toner-applied image is transferred onto the transfer belt 5 of the transfer unit. The images thus transferred with registration by the photosensitive drums 3Y, 3M, 3C and 3B are subjected to positioning for each scanning line. Specific images scanned in the main-scanning direction are transferred in the sub-scanning direction to form one image. The 4-tandem image-forming apparatus determines whether or not there is image mis-registration on each color before forming one image and correct mis-registration if occurred.

The correction control unit 10 in FIG. 1B is provided with a sensor 11 for detecting images transferred onto the transfer belt 5, a mis-positioning amount calculator 12 for calculating an amount of mis-positioning based on the output of the sensor 11, a controller 13 for calculating an correction amount to each of the reflecting mirrors 26Y, 26M, 26C and 26B for respective colors to output correction signals, and adjusters 14Y, 14M, 14C and 14B for adjusting angles of the reflecting mirrors 26Y, 26M, 26C and 26B, respectively, based on the correction signals generated for the reflecting mirrors 26Y, 26M, 26C and 26B.

Black among the four colors yellow, magenta, cyan and black is used instead of composing black by registration of the other three colors. A monochrome-mixed image includes many black images. The photosensitive drum for black is situated most distant from the polygonal mirror 22. These are the factors for the laser beam from the reflecting mirror 26B for forming a black image to be used as a reference light beam. The reflecting mirrors 26Y, 26M and 26C for the other three colors are subjected to correction of mis-positioning in relation to the reference black laser beam.

Figure 2:
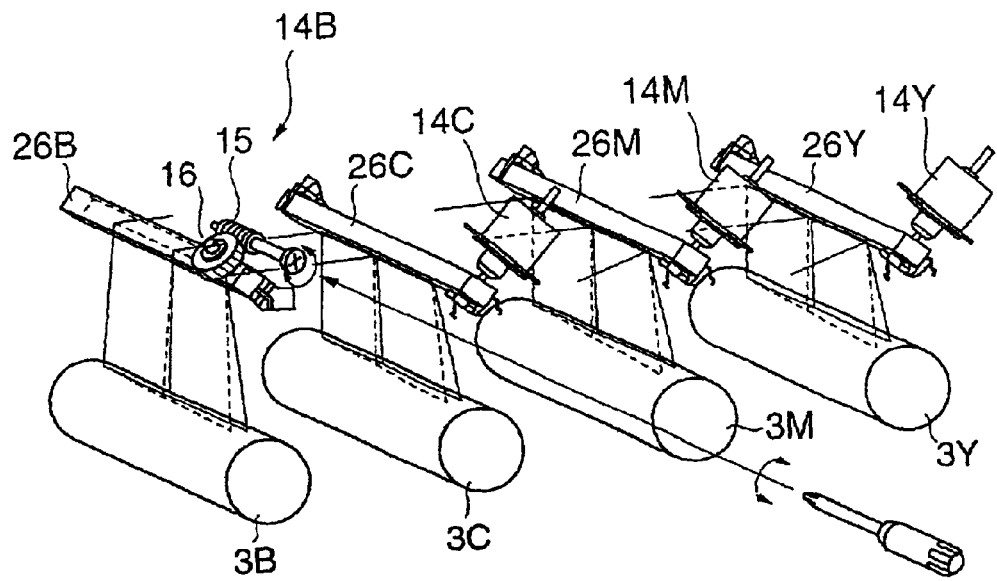
FIG. 2 is a perspective view showing an adjusting mechanism for manually adjusting a mirror for reflecting a reference light beam.

A first example of a detailed structure of the mis-positioning correction mechanism is illustrated in FIG. 2. The adjusters 14Y, 14M, 14C and 14B are provided for the reflecting mirrors 26Y, 26M, 26C and 26B, respectively, in FIG. 2, for adjusting angle of reflection of light beams to the corresponding photosensitive drums 3Y, 3M, 3C and 3B. The adjusters 14Y, 14M and 14C for the light beams other than the reference beam in FIG. 2 have automatic adjusting mechanisms for adjusting angles of refection at the reflecting mirrors 26Y, 26M and 26C by pressing one side of the reflecting mirrors 26Y, 26M, 26C with the help of rotation of a motor, etc. The adjuster 14B for adjusting an angle of reflection at the reflecting mirror 26B for reflecting the reference light beam to the black photosensitive drum 3B is made up of a manual adjusting mechanism having a worm gear 15 and a worm wheel 16.

Figure 3:
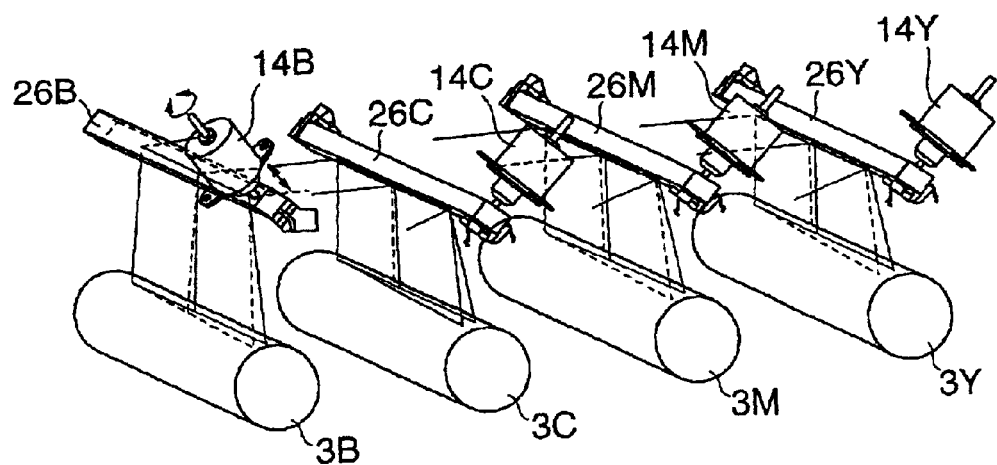
FIG. 3 is a perspective view showing an adjusting mechanism for automatically adjusting a mirror for reflecting a reference light beam.

Not only the first example shown in FIG. 2, the mis-positioning correction mechanism may be configured as a second example illustrated in FIG. 3. The second example includes all of the adjusters 14Y, 14M, 14C and 14B as the automatic adjusting mechanisms to all of the reflecting mirrors 26Y, 26M, 26C and 26B.

Provided in FIGS. 1B, 2 and 3 are the means for matching a reference light beam used for printing a black image to the reference of the main frame, that is, the adjuster 14B and the means for matching the other light beams to the reference light beam, that is, the adjusters 14Y, 14M and 14C. The adjuster 14B is provided at the mirror 26B most distant from the polygonal mirror 22 or the polygon motor 23, as the reference matching means. Positioning by the latter adjusters 14Y, 14M and 14C are periodically performed in a predetermined timing after power is on for the main frame. The former adjuster 14B performs positioning for a period longer than that by the latter adjusters. The means for matching the reference light beam to the reference main frame is a manual adjusting means as illustrated in FIG. 2.

The distortion correction described above, which is different from adjustments to the reference mirror 26B to the optical center, could cause a problem in that light beams do not meet each other in the entire scanning zone due to accumulation of errors in fθ-characteristics and those occurring after positioning of mirrors that guide light beams to the photosensitive drums, or occurrence of partial color mis-registration in the scanning direction. In other words, positioning at both scanning ends by read-out timing adjustments in the main-scanning direction or magnification adjustments causes noticeable mis-positioning on the center scanning zone whereas positioning at the center causes noticeable mis-positioning at both scanning ends. In general, these problems are solved by accuracy of components while assembly, thus increasing cost for components while decreasing efficiency in mass-production.

Figure 4:
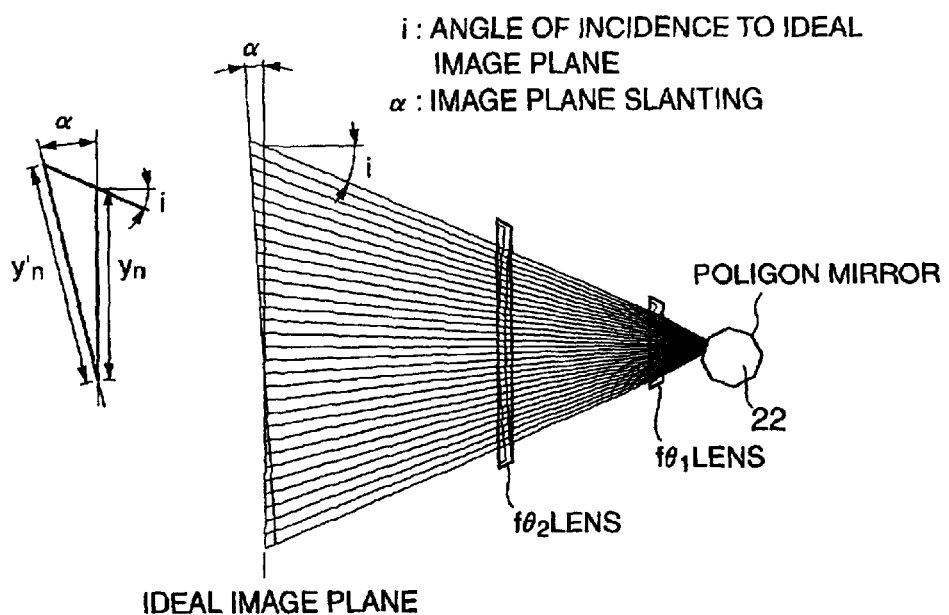
FIG. 4 is an illustration indicating slants of main-scanning light beams in relation to a sub-scanning direction.
Figure 5:
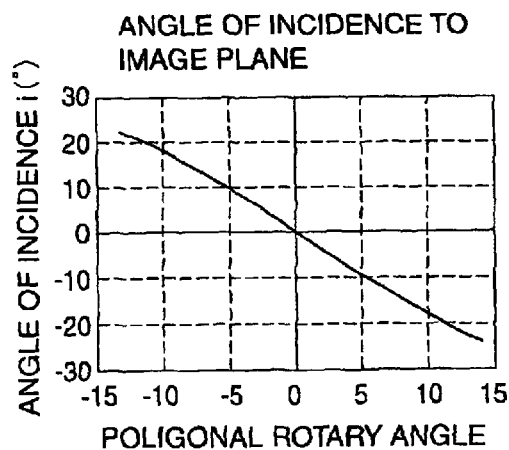
FIG. 5 is a graph indicating the characteristics of angle of incidence to image plane in relation to polygonal rotary angle.
Figure 6:
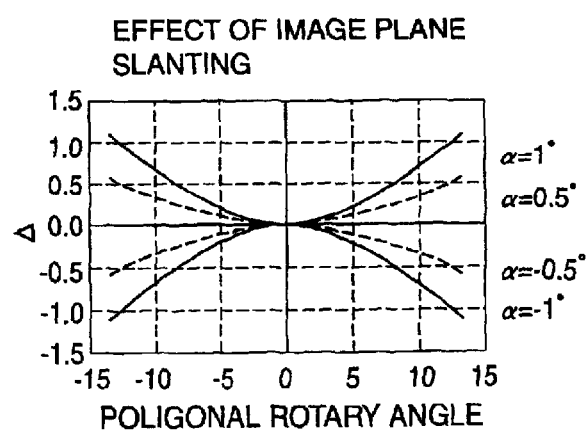
FIG. 6 is a graph indicating the characteristics of effect of inclination of image plane.
Figure 7:
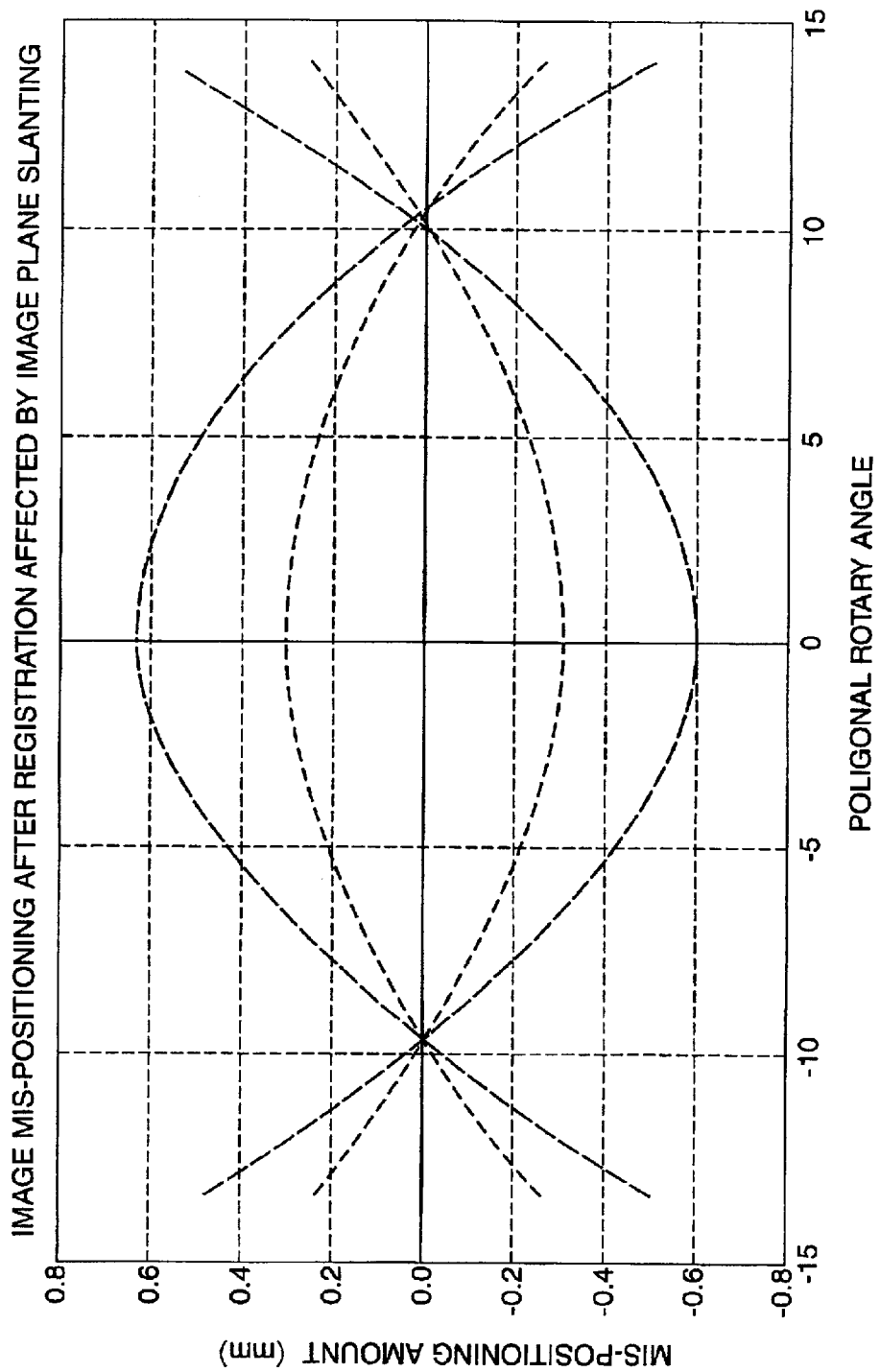
FIG. 7 is a graph indicating the characteristics curves of image mis-registration after positioning under effect of inclination of image plane.

The slanting error in the main-scanning direction and correction of such errors are discussed briefly with reference to FIGS. 4 to 10. The signs "i", "α", "$y_n$" and "$y_n'$" in FIG. 4 denote an angle of incidence to an ideal image plane, slanting in image plane, a scanning position at the ideal image plane and a scanning position at the slanting image plane, respectively. An amount of mis-positioning Δn between the scanning position at the slanting image plane and that at the ideal image plane is expressed as follows:

$$\Delta n = y_n' - y_n$$

$$\Delta n = [1 - \{\cos(i_n + \alpha)/\cos(i_n)x\}] \times y_n$$

where $i_n$ and α denote an angle of incidence for light beam and image plane slanting, respectively. FIG. 5 shows change in angle of incidence "i" to image plane on the ordinate to polygonal rotary angle on the abscissa. FIG. 6 shows the effect of image plane slanting under polygonal rotary angle on the abscissa and amount of mis-positioning Δ on the ordinate. Characteristic curves shown in FIG. 7 with polygonal rotary angle on the abscissa and amount of mis-positioning on the ordinate indicate mis-positioning of images after registration affected by image plane slanting. The slanting in image plane α in the main-scanning direction occurring as shown in FIG. 4 causes several problems such as shown in FIGS. 5 to 7. Correction has to be made so that slanting does not occur in the main-scanning direction for solving the problems.

Figure 8:
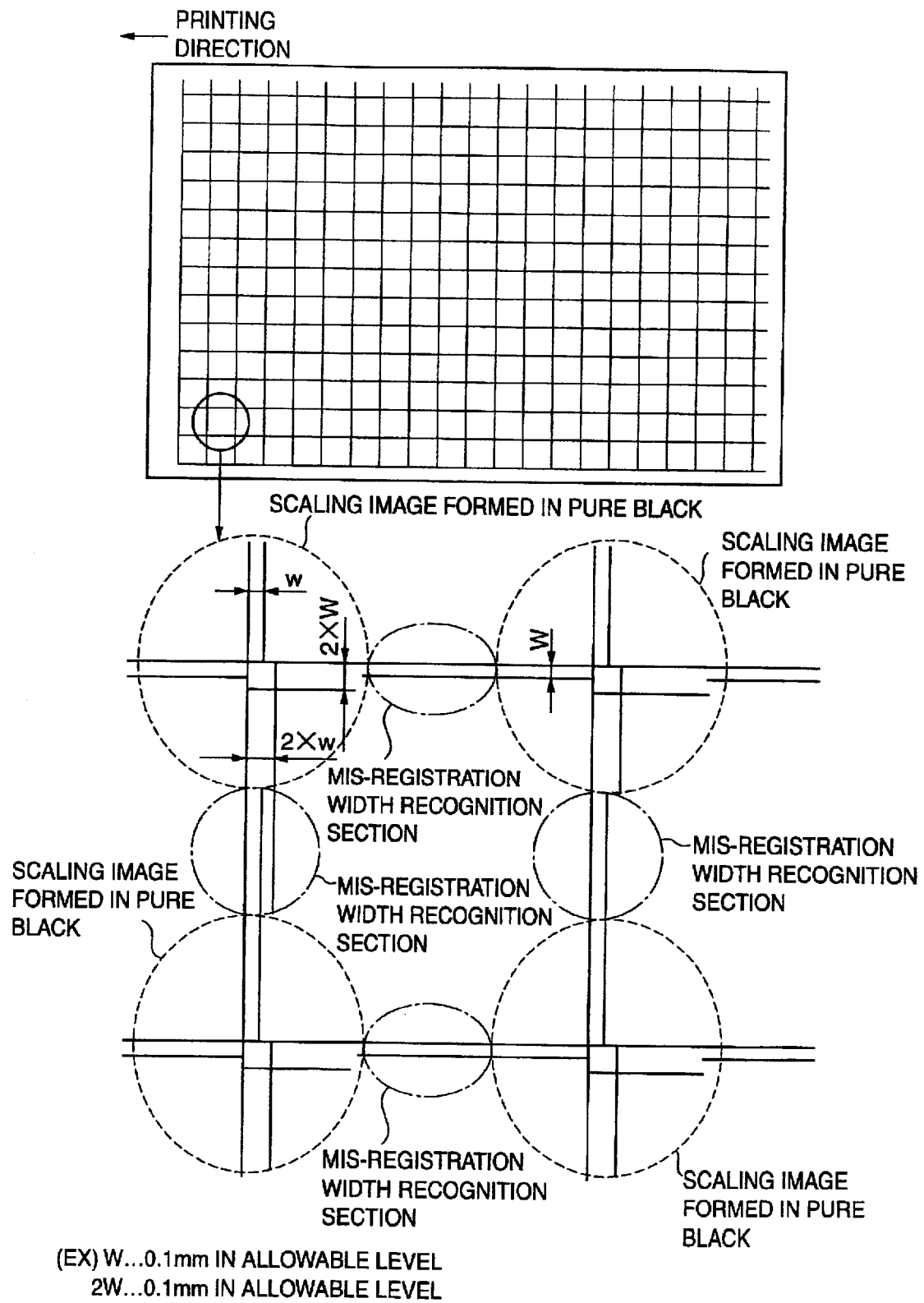
FIG. 8 is an illustration indicating a first chart for measuring image mis-registration and explaining its positioning.
Figure 9:
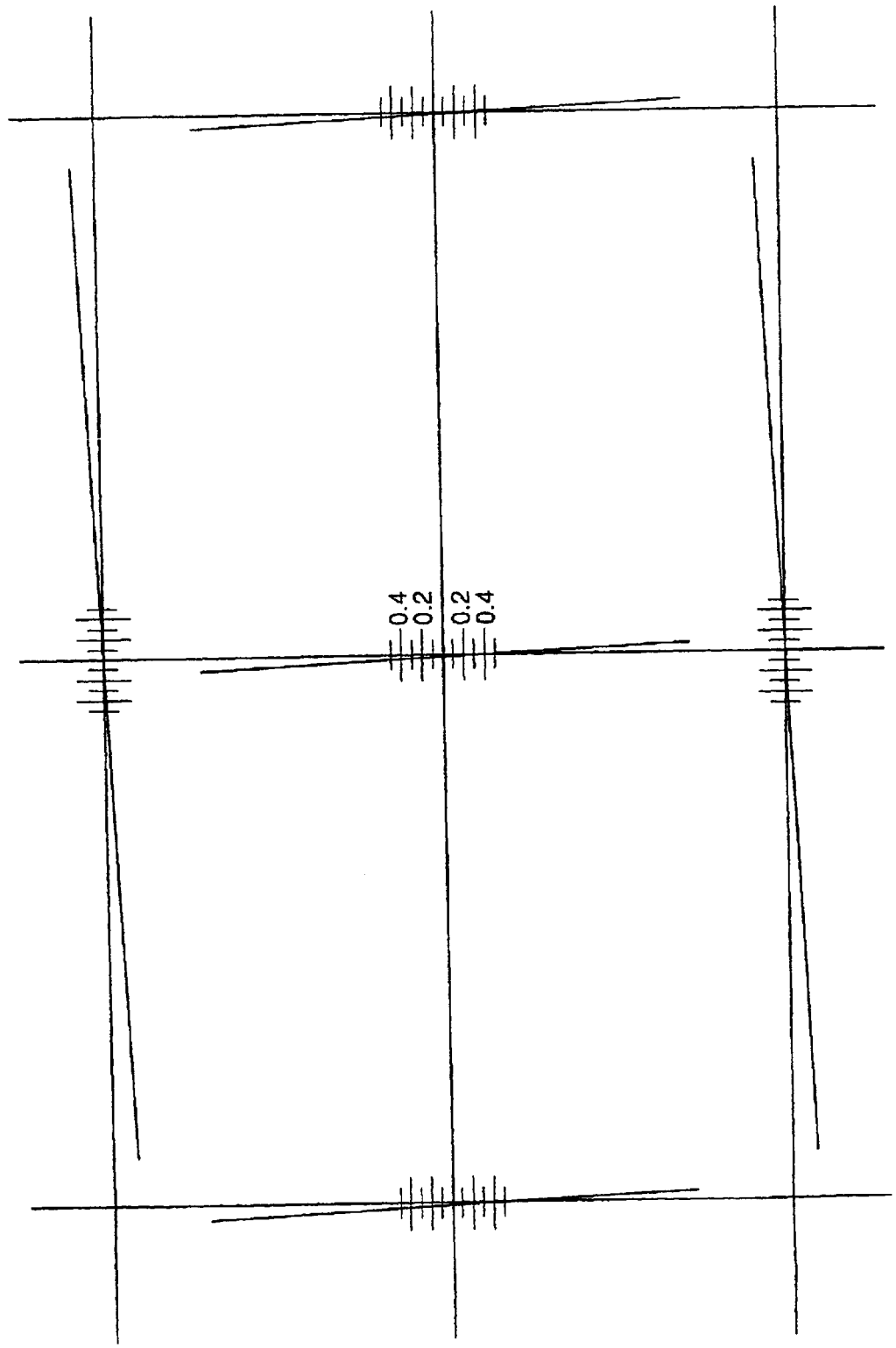
FIG. 9 is a plan view indicating a second chart for measuring image mis-registration.
Figure 10:
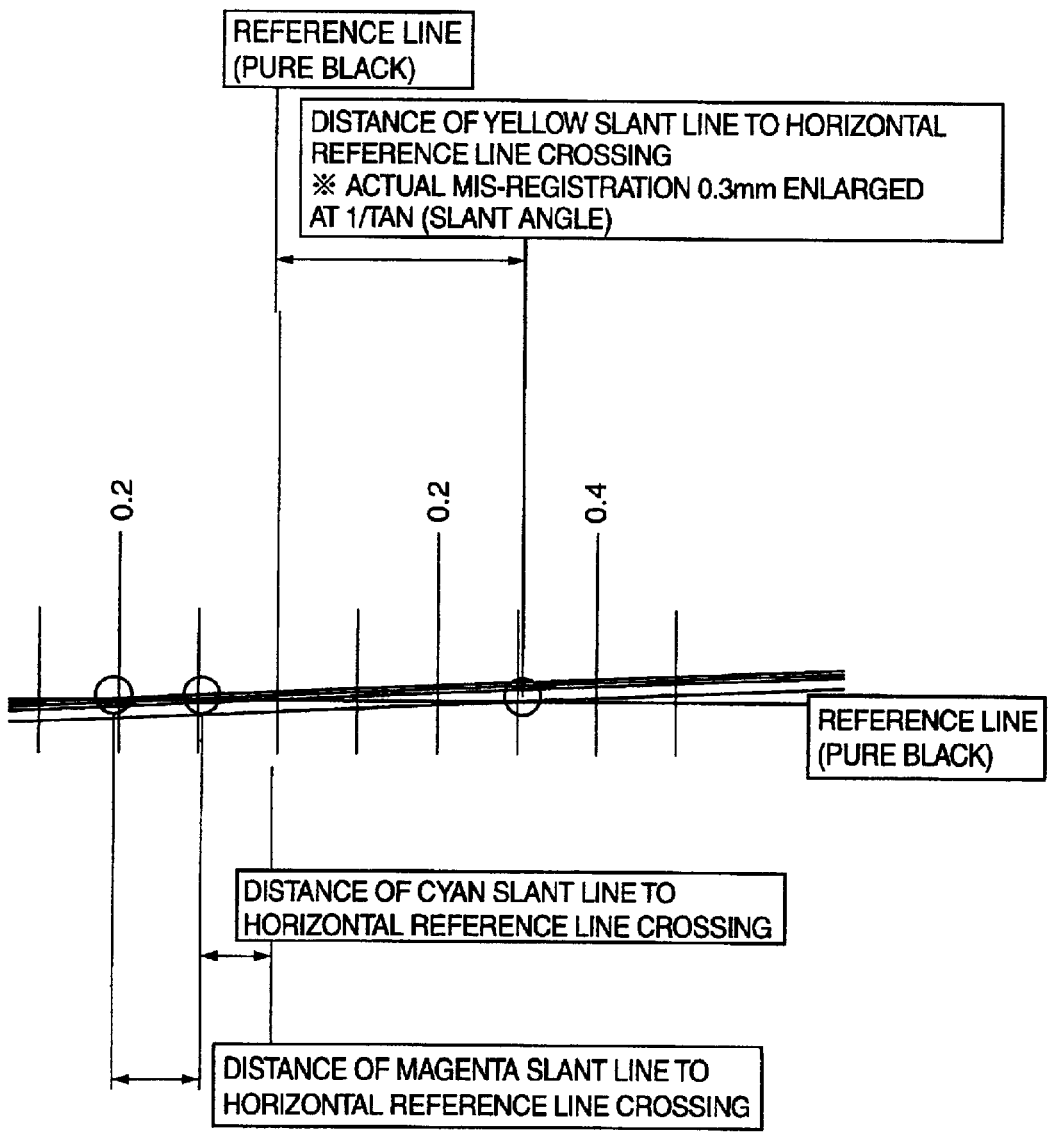
FIG. 10 is an enlarged illustration of main portion of the second chart shown in FIG. 9.

Methods of correction employ a chart for measuring mis-registration, such as, those shown in FIG. 8 (a first proposal) and FIGS. 9 and 10 (a second proposal). The first proposal shown in FIG. 8 employs a scaling image with blocks formed with black only in an image printing direction. Shown below in FIG. 8 are enlarged illustrations (surrounded by dashed circles) of one block shown upper side of figure.

When the upper chart in FIG. 8 is actually measured to obtain the results as illustrated below, as apparent from lower illustrations in FIG. 8, measured values at mis-registration width recognition sections surrounded by dashed lines are analyzed to measure portions of a width W and 2×W. For example, an allowable level for the portion of a width W is 0.1 mm and that for 2×W is 0.2 mm, the allowable limitation. No correction is required when the measured chart lies in the width 2×W.

The second proposal for mis-registration chart illustrated in FIGS. 9 and 10 measures an image formed on blocs having gauges in a specific direction. FIG. 10 is an enlarged illustration of the center having gauges. An amount of mis-registration for each color image is measured on a printed sheet when reference lines of pure black are formed in vertically and horizontally. The three small circle sections indicate amounts of mis-registration for respective colors in relation to the reference lines formed in vertically and horizontally. The right circle indicates a distance of slanting lines of yellow to the cross sections of the horizontal reference lines, an actual amount of mis-registration 0.3 mm being enlarged at 1/tan(slant angle). The center but little bit left side circle indicates an amount of distance of slanting lines of cyan to the cross sections of the horizontal reference lines. The leftmost circle slanting an amount of distance of slanting lines of magenta to the cross sections of the horizontal reference lines. These gauges are used for measuring amounts of mis-positioning from the reference lines for respective colors.

Figure 11:
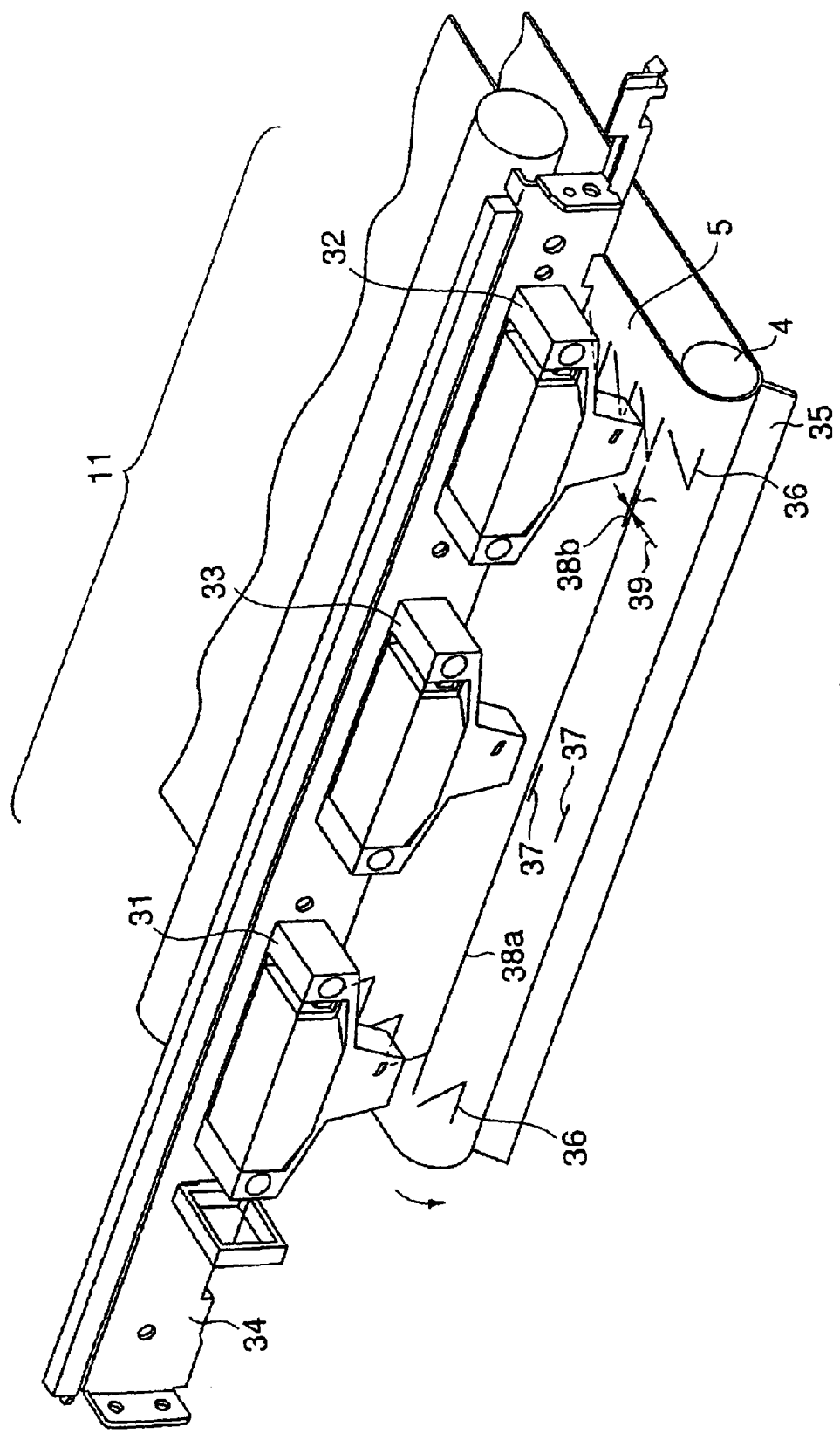
FIG. 11 is a perspective view showing three sensors and detection marks as a detailed structure of the mis-positioning detection section in FIGS. 1A and 1B.

Amounts of mis-positioning for marks "V", formed at both ends of a belt illustrated in FIG. 11 are generally detected by first and second detectors provided at both ends in a main-scanning direction. Such detection of mis-positioning at both ends in the main-scanning direction can, however, not accurately measure mis-positioning at the center. A third detector is thus provided at the almost center in the main-scanning direction like the first and the second detectors at the both ends in the main-scanning direction. Averaging amounts of mis-positioning at the both ends and that at the center balances the fθ-characteristics for small amount of image mis-registration on an entire image.

Detection of mis-positioning at the center in the main-scanning direction can be achieved by shifting either the first or the second detector from its original end position to the center after correction of mis-positioning at both ends in the main-scanning direction with general image registration correction control. This method provides a drastic effect using a sensor-shift mechanism in addition to general sensors (no additional expensive sensors required) with image registration adjustments and switching of sequences for fθ-characteristics adjustments.

Correction of amount of mis-positioning at the center is not a daily but a special operation belonging to repair or maintenance. An operator can set the shown special patterns installed in the image forming apparatus in adjustment mode, print out an image of set pattern for adjustment, measure mis-positioning of the image in the main-scanning direction at both ends and the center of the image by visual check and enter an amount of mis-positioning via input device, thus the image forming apparatus determining an amount of correction by computation based on the input amount of mis-positioning, with no complex automatic adjustment system. Explanation of the succeeding operation is omitted because it is the same as that for a controlling operation for automatic adjustments which will be described later.

Figure 12:
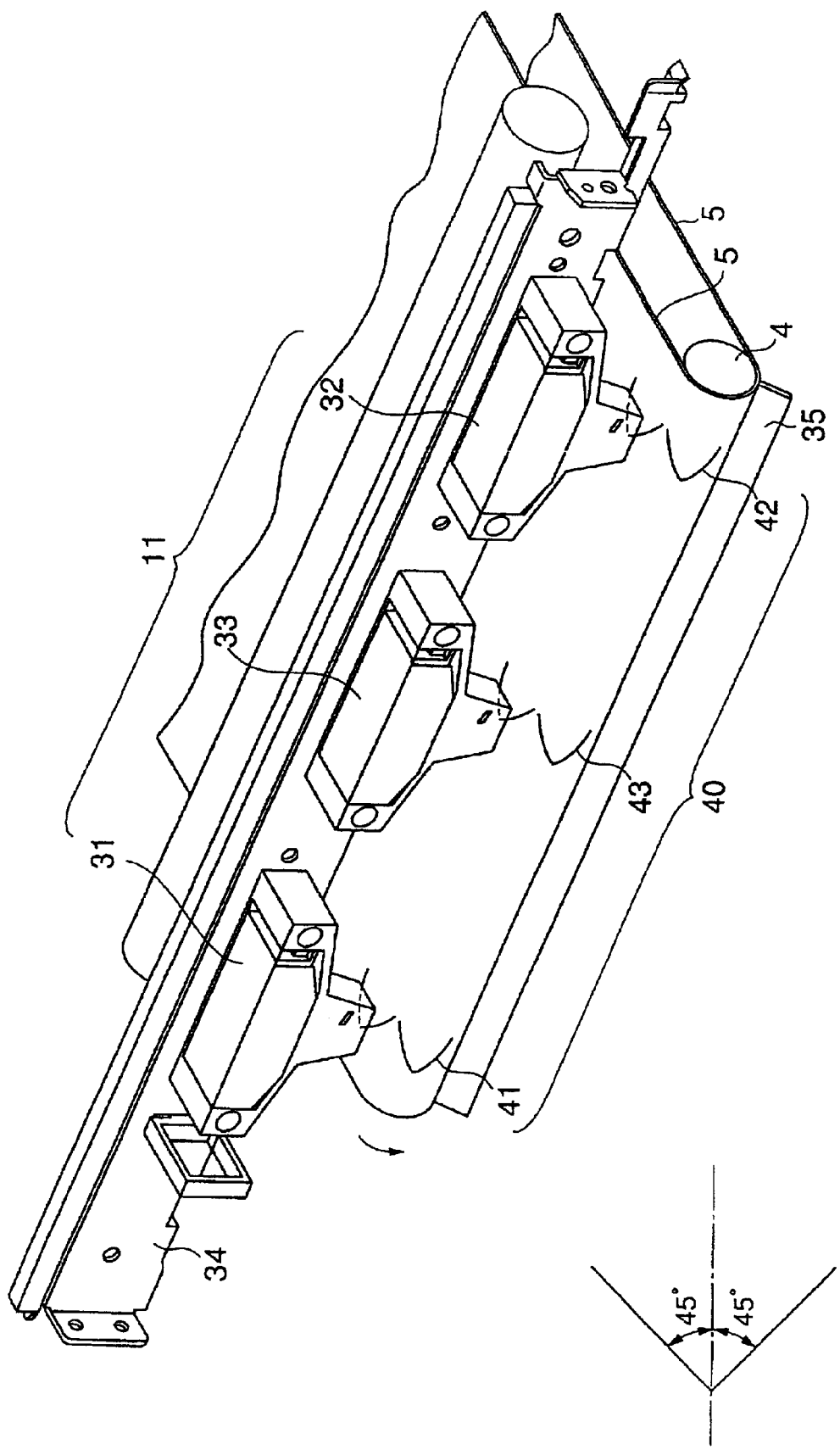
FIG. 12 is a perspective view indicating an operation of the mis-positioning detection section and showing detection marks different from those shown in FIG. 11.

Described with respect to FIGS. 11 and 12 is an slant detecting means having a fixed-type third detector. A sensor 11 in FIG. 11 has a pair of first sensors 31 and 32 provided over both ends of a transfer belt 5 in the main-scanning direction perpendicular to a travel direction of the belt and a second sensor 22 provided almost at the center in the main-scanning direction. The sensors 31, 32 and 33 are attached on the main frame by a sensor support 34 extending almost in the main-scanning direction. The transfer belt 5 is conveyed in the sub-scanning direction by a transfer belt-driving roller 4. The shown drive roller 4 is provided at the outlet side in image formation. As illustrated in FIG. 1B, another drive roller 4 is provided at the inlet side in image formation. Provided obliquely under the transfer belt-driving roller 4 at the outlet side in FIG. 11 is a cleaning blade 35 for removing toner, etc., attached to the transfer belt 5.

Detection marks 36 for detecting usual mis-registration are formed at both ends of the transfer belt 5, the locations corresponding to the first sensors 31 and 32. Also provided at the center of the transfer belt 5 are marks 37 for detecting mis-registration at the center. Detection of usual mis-registration is performed by detecting the detection marks 36 formed on the upper-side of the transfer belt 5 in relation to the drive roller 4 by the first sensors 31 and 32 provided at both ends in the main-scanning direction. Mis-positioning between levels 38a and 38b detected by the sensors 31 and 32, respectively, indicates a gap 39, distortion as a delay in timing after both ends of the transfer belt 5 is sensed. An amount of mis-positioning at the center is detected by detecting the marks 37 formed at the center in the main-scanning direction by the second sensor 33.

The detection marks 36 at both ends in FIG. 11 are formed like a wedge in the main-scanning direction, which are used, as described, for detecting a delay in timing by the gap 39 as distortion. In addition to this function, the present invention is provided with detection marks 40 at specific locations on the transfer belt 5 as illustrated in FIG. 12 for accurate detection of mis-positioning of the reference light beam in the main-scanning direction in relation to the sub-scanning direction.

In FIG. 12, the detection marks 40 are formed at the locations of the detection marks 36 and 37 in FIG. 11. In detail, marks 41 and 42 are formed at the locations corresponding to the marks 36, and marks 43 are formed at the locations of the marks 37. The marks 41, 42 and 43 have a wedge-like shape, as shown in left under, that opens at 90 degrees with slant angles of 45 degrees from the reference line in the sub-scanning direction as indicated by dashed lines.

Mis-positioning in the main-scanning direction causes a time difference for each of two time-detection of the marks 41, 42 and 43 formed at both ends and the center in the main-scanning direction by the sensors 31, 32 and 33, respectively. In detail, it causes a time difference for the two slanting lines of the marks 41, 42 and 43 that pass under the sensors 31, 32 and 33, respectively. The time difference is automatically detected as an amount of mis-positioning to accurately detect a slant in the main-scanning direction.

As described, mis-positioning in the main-scanning direction is detected by using wedge-like marks in general at a pitch through which ridge lines of the wedge mis-positioned in the sub-scanning direction pass at the pitch of the line extending in the main-scanning direction. On the contrary, the present invention employs marks specialized for detection of mis-positioning in the main-scanning direction having two lines not extending but slanting at 45 degrees in the main-scanning direction for higher sensitivity to change in passing time to mis-positioning in the main-scanning direction.

The examples shown in FIGS. 11 and 12 are provided with a pair of sensors 31 and 32 for usual detection of mis-positioning at both ends in the main-scanning direction and the sensor 33 for detection of mis-positioning at the center. Not only limited to this, the present invention can use other sensors for detection of mis-positioning at both ends and the center in the main-scanning direction. For instance, as illustrated in FIGS. 13 and 14, one of a pair of sensors provided at either end is movable for detection of mis-positioning at one end and the center.

Figure 13:
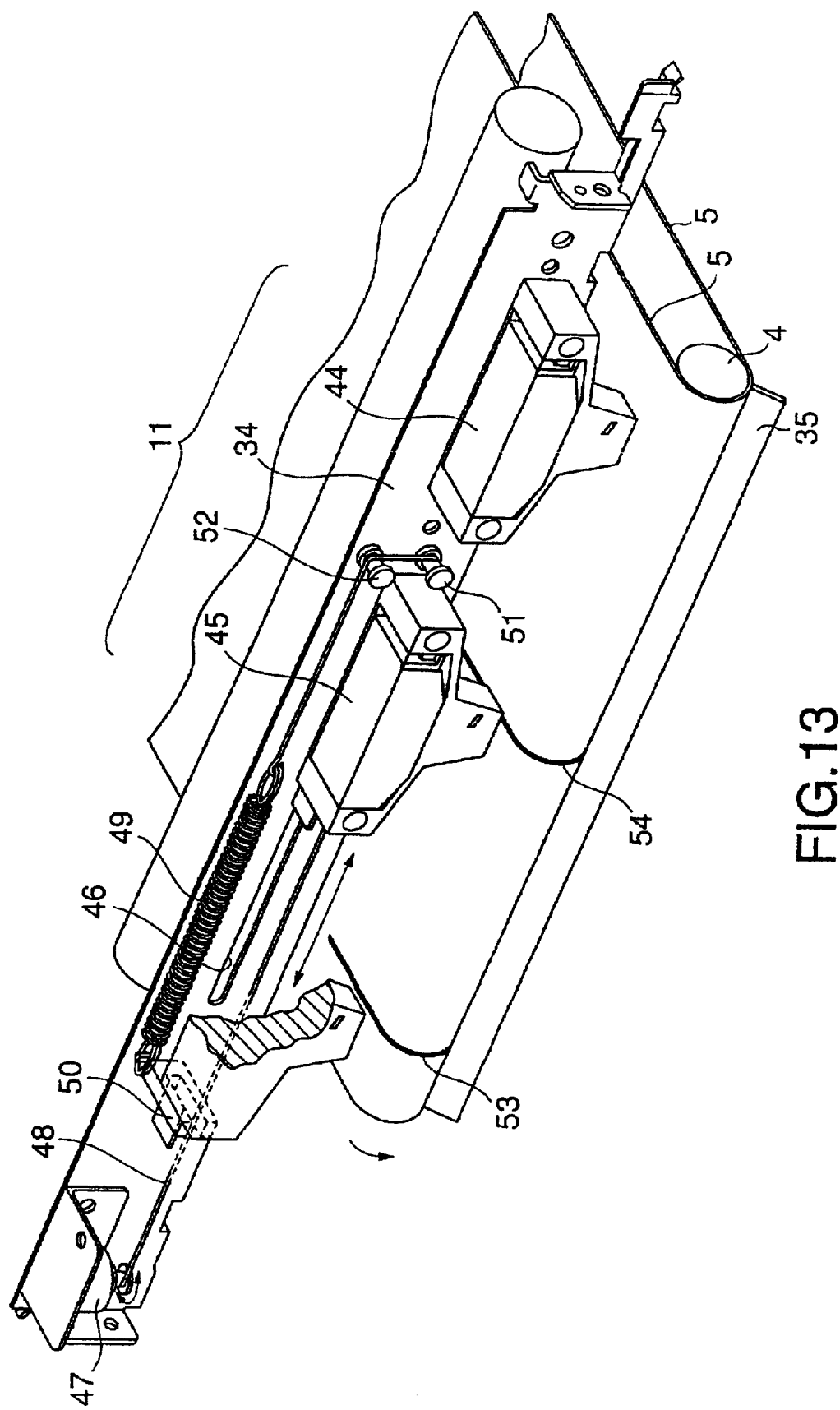
FIG. 13 is a perspective view showing a modification to the mis-positioning detection section, having two sensors acting as three sensors.
Figure 14:
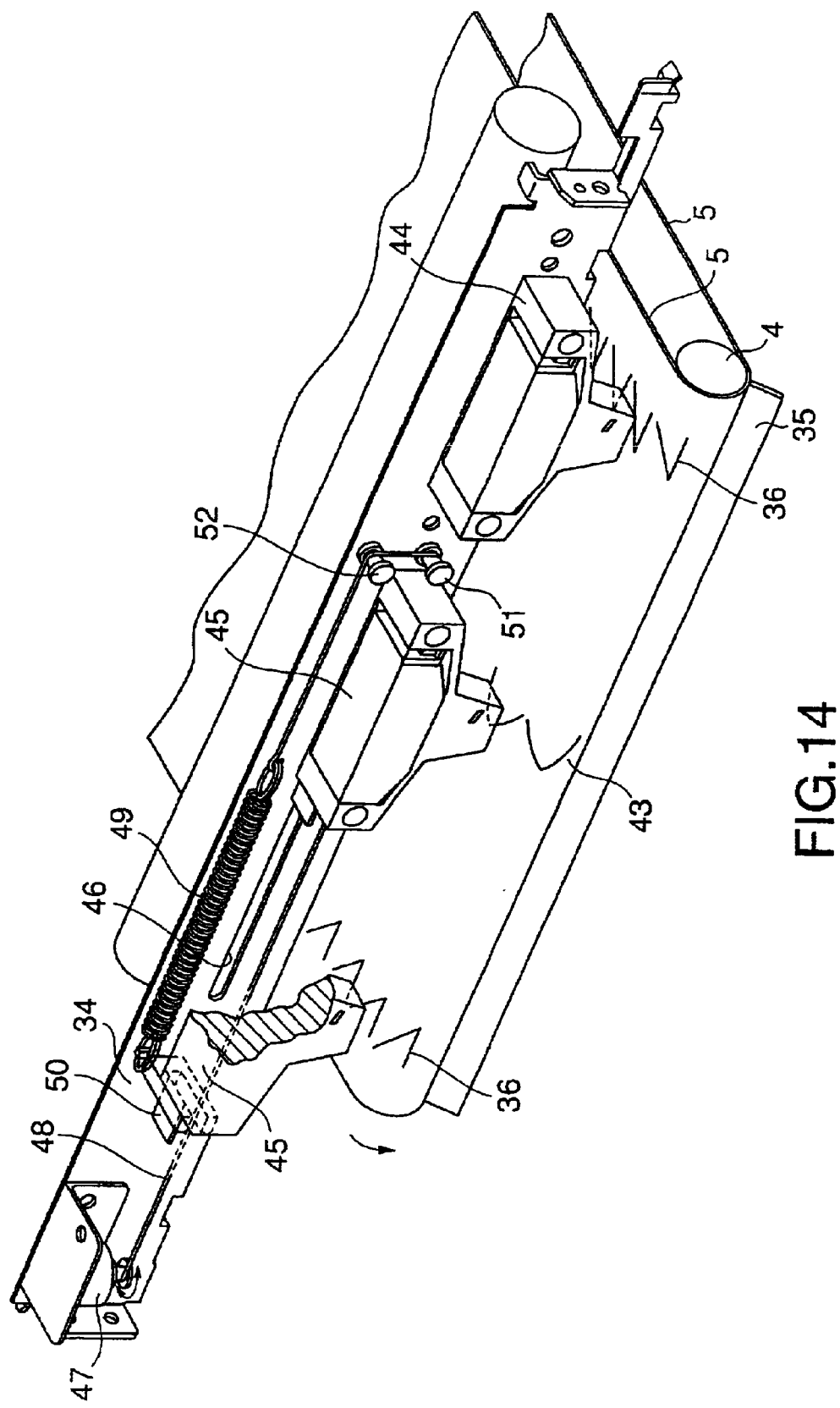
FIG. 14 is a perspective view indicating an operation of the mis-positioning detection section shown in FIG. 13.

In FIG. 13, a sensor 11 is provided with a first sensor 44 for detection of mis-positioning at one end in the main-scanning direction and a second sensor 45 provided as slidable between the other end and the center in the main-scanning direction for detection of mis-positioning at the other end and the center. Also provided like shown in FIGS. 11 and 12 are the transfer belt 5, drive roller 4, sensor support 34 and cleaning blade 35, etc. The second sensor 45 is slidable and hence provided with a mechanism for movement and stoppage for positioning, which is disclosed below in detail.

The second sensor 45 is engaged with but slidable along a guide slot 46 formed on the sensor support 34 by means of a slidable support member (not shown) for supporting the sensor body on the sensor support 34. A drive motor 47 is provided at the other end of the sensor support 34 for sliding the second sensor 45. Stretched between the motor 47 and the second sensor 45 is a drive wire 48 for driving the second sensor 45. An end of the drive wire 48 is engaged with a rotary shaft of the motor 47 to be wound around the rotary shaft, the center portion being engaged with the second sensor body 45 and the other end being hooked at a spring 49 for pulling the sensor. The second sensor 45 is slidable between a stopper 50 and rotary members 51 and 52. In detail, the movement of the second sensor 45 is restricted at the other end by the regular positioning stopper 50 and at the center by the two rotary members 51 and 52 via which a stretched direction of the wire 48 is reversed two times by 90 degrees while it is moving.

According to the structure described above, the wire 48 is wound on the motor 47 so that the second sensor 45 moves to touch the stopper 50 and stop there for being positioned to function as the end-side sensor. A mark detected by the end-side sensor is a mark 53 for regular positioning recognition. The motor 47 is then rotated in the reverse direction to loose the wound wire 48 so that the second sensor 45 starts to move to the center in the main-scanning direction and stops at the two rotary members 51 and 52 to function as the center-side sensor.

Disclosed with reference to FIG. 14 is a mechanism for regular detection and detection at the center by means of position detection marks separately formed on one side and the center in the main-scanning direction. Marks shown in FIG. 14 are the side-detection marks 36 and the center-detection marks 43 shown in FIGS. 11 and 12, respectively. The side-detection marks 36 are formed like a wedge having a line parallel to the main-scanning direction and another line that crosses the former line at a specific angle for detection of the gap 39 shown in FIG. 11. The deletion marks 43 are formed like a wedge having lines each slanting at 45 degrees to the main-scanning direction.

Disclosed next is an operation of the position-detecting system of the image forming apparatus having the mechanism described above for mis-positioned-amount averaging process. The system requires detection of amounts of mis-positioning in the main-scanning direction, sub-scanning direction, an amount of change in magnification, a degree of parallelism in scanning lines, and an amount of mis-positioning at the center and averaging the detected amounts to obtain a correction value for feed-back control. While the apparatus is in a warm-up condition, changes that could occur for several ten minutes from power-on are mainly those in main/sub-scanning direction and magnification due to increase in temperature inside the apparatus. In addition to those changes, changes could occur on parallelism or at the center right after maintenance and re-assembly.

The known system uses several identical detection patterns formed on the transfer belt for detection of amounts of mis-positioning. On the other hand, the present invention uses patterns formed only at both ends of the belt in detection of regular mis-registration, and also uses patterns formed other than the ends in positioning control after re-assembly in maintenance to detect amounts of mis-positioning in the main-scanning direction, change in magnification for main-scanning and at the center, the detected amounts being averaged for feed-back control. The present invention therefore offers optimum adjustments under recognition of entire amounts of mis-positioning in consideration of the fθ-characteristics with correction of mis-positioning in main-scanning including the center.

Disclosed so far is the entire and also partial mechanism of the image forming apparatus according to the present invention. Operations of the entire and partial mechanism of the image forming apparatus are disclosed briefly with reference to flow charts shown in FIGS. 15 to 26.

Figure 15:
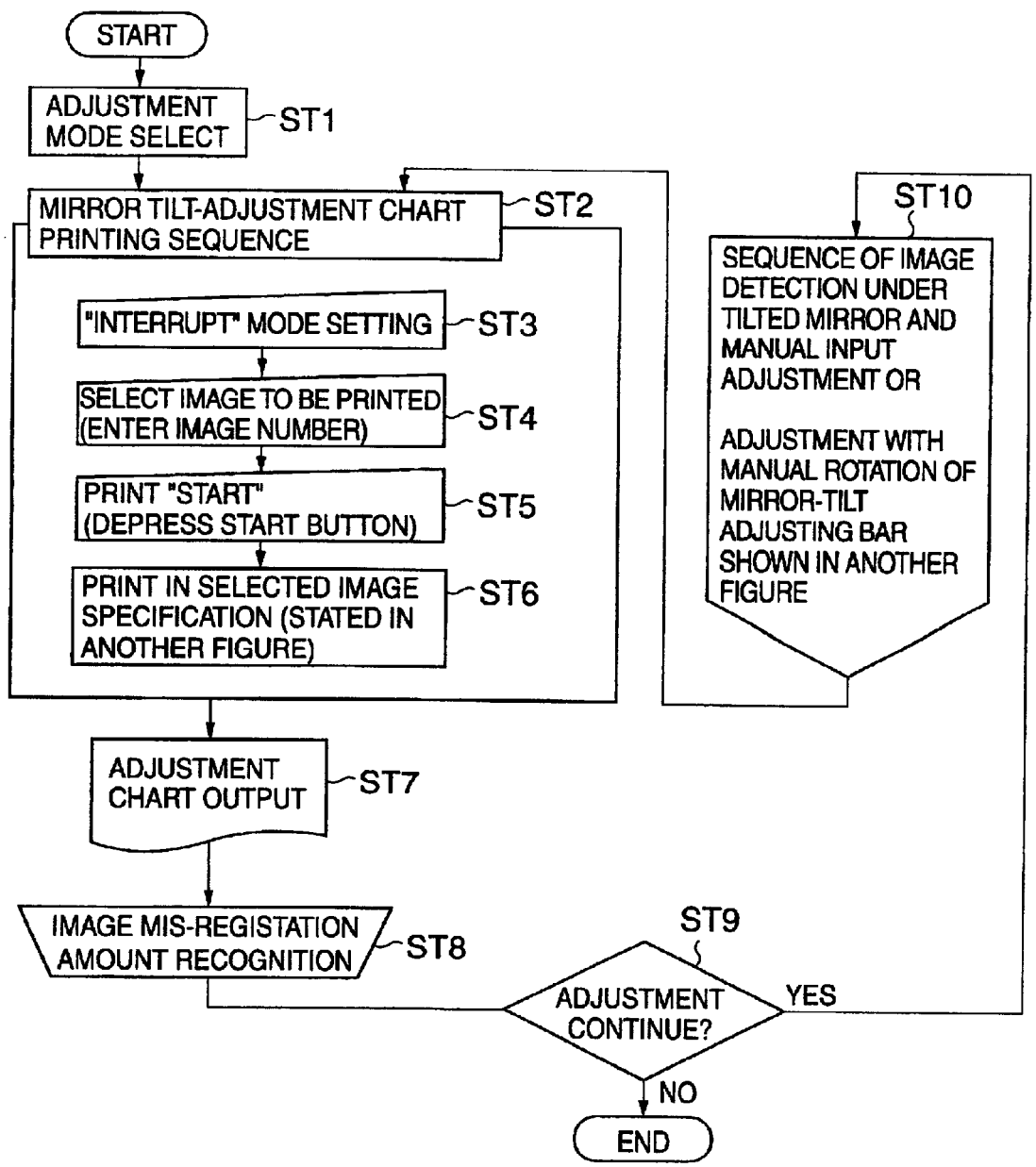
FIG. 15 is a flow chart explaining an operation of the manual adjusting mechanism shown in FIG. 2.

FIG. 15 shows a flow chart for explaining an operation of manual adjustments to the reflecting mirror 26B for the reference light beam shown in FIG. 2. Words with the quotation marks " ", such as "INTERRUPT" indicate modes set via an operational button. At first, an adjustment mode is selected in step ST1. The sequence goes to step ST2 when selected is the mode in which an angle of a reflecting mirror in the main-scanning direction is manually adjusted using a printed chart. The step ST2 is a chart-printing sequence for mirror-tilt adjustments including steps ST3 to ST6.

In ST3, an "INTERRUPT" button is depressed to set an "INTERRUPT" mode. An image number is entered in step ST4 to choose an image to be printed. A "START" button is depressed in step ST5 to start printing. Printing is executed in step ST6 in accordance with the specifications for choosing image to be printed described later. After the printing settings, an adjustment chart is printed out in step ST7 such as the first example described with reference to FIG. 8 or the second example to FIGS. 9 and 10. An operator observes the output chart and recognizes an amount of image mis-registration in step ST8.

Determined next in step ST9 is whether or not to continue the adjustments or to start the adjustments if it is the first time. The sequence is halted when no tilt adjustments to a reflecting mirror are required in relation to the reference lines. On the other hand, mirror-tilting is performed in step ST10 when determined that manual tilt adjustments are required for the reflectiing mirror 26B. The mirror-tilting is performed with the adjustment sequence using an amount of image mis-positioning entered via detecting means or turning a screw attached to the mirror-tilt adjustment warm gear 15 shown in FIG. 2, as already disclosed. After the adjustments in step ST10, the sequence in step ST 2 is executed again to print out an adjustment chart in step ST7. An operator can make adjustments with determination of whether to continue the adjustments in step STSP9 until he or she satisfies the results.

Figure 16:
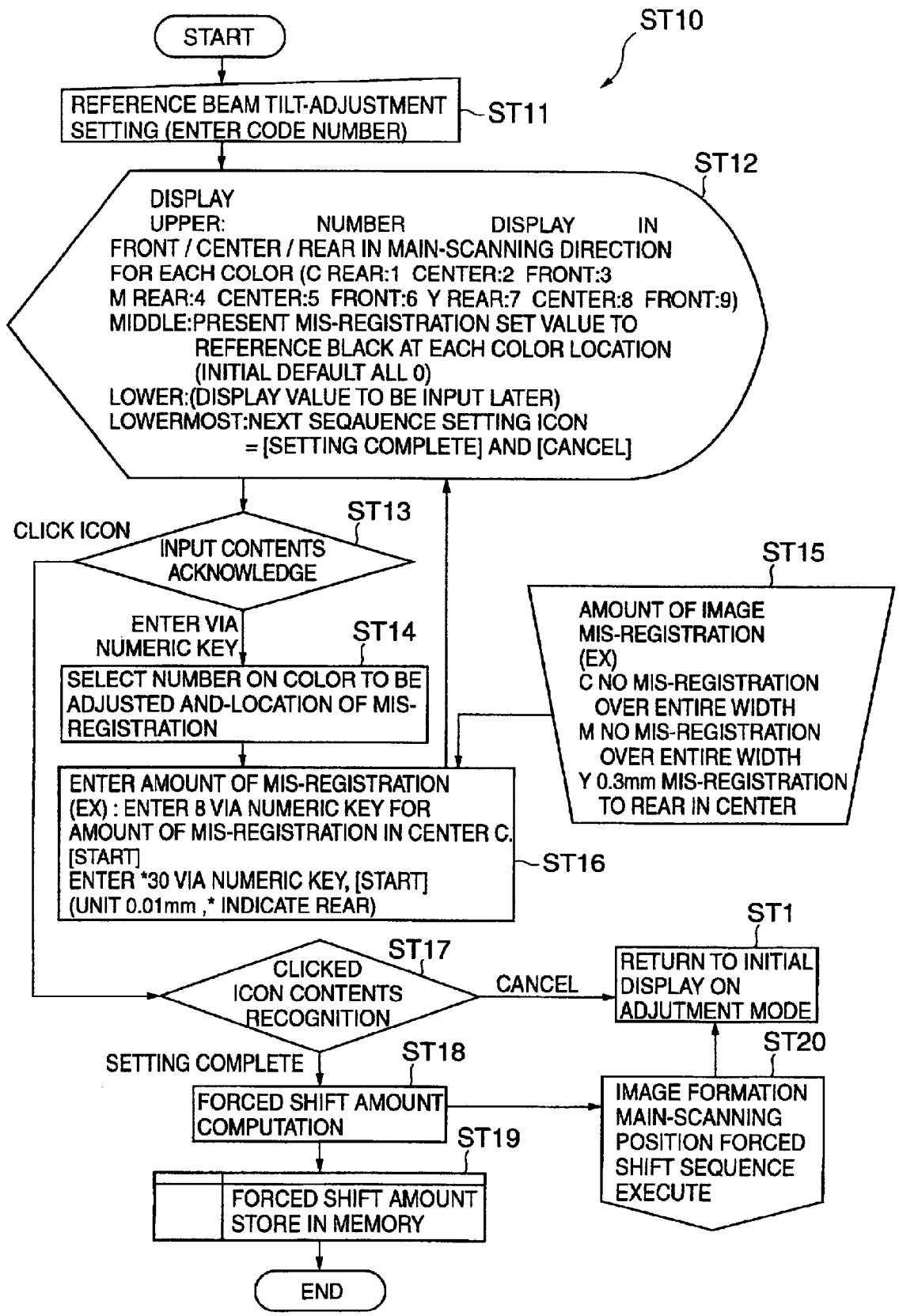
FIG. 16 is a flow chart explaining an operation in image detection in reference-beam slanting correction and manual adjustments.

Disclosed with reference to a flow chart shown in FIG. 16 is the sequence of detection of image mis-positioning and manual adjustments in step ST10 (FIG. 15) when the reference lines are slanting.

The sequence in step ST10 includes steps ST11 to ST19. In FIG. 16, a reference beam tilt-adjustment mode is set via user code-number entry, etc. Shown in step ST12 is an image displayed in adjustments. An operator determines the contents of entry in step ST13 while viewing the image displayed in step ST12. Any operation required after determination is performed with entry of any number displayed in the image in step ST12 via numeric keys. The numbers corresponding to color to be adjusted and the location of mis-registration are chosen in step ST14. The entry on amounts of mis-registration are performed as shown in step ST16 according to the amounts of mis-registration with reference to the display in step ST15. On completion of entry via the numeric keys through steps ST13 to ST16, the operator clicks an icon in step ST13, and the sequence goes to the determination step in step ST17.

The contents of the selected icon is recognized in step ST17, and if no problem occurring, a forced-shifting amount is automatically computed in step ST18 and stored in memory in step ST19. On the other hand, when the operator determines to cancel the settings after recognition of the contents of the selected icon in step ST17, the sequence may go back to the initial display in step ST1 shown in FIG. 15. Moreover, after the computation of the forced-shifting amount in step ST18, not only the shifting amount is stored in step ST19 but also an image-forming main-scanning position forced-shifting sequence may be executed in step ST20, and then the sequence may go back to the initial display in step ST1.

Figure 17:
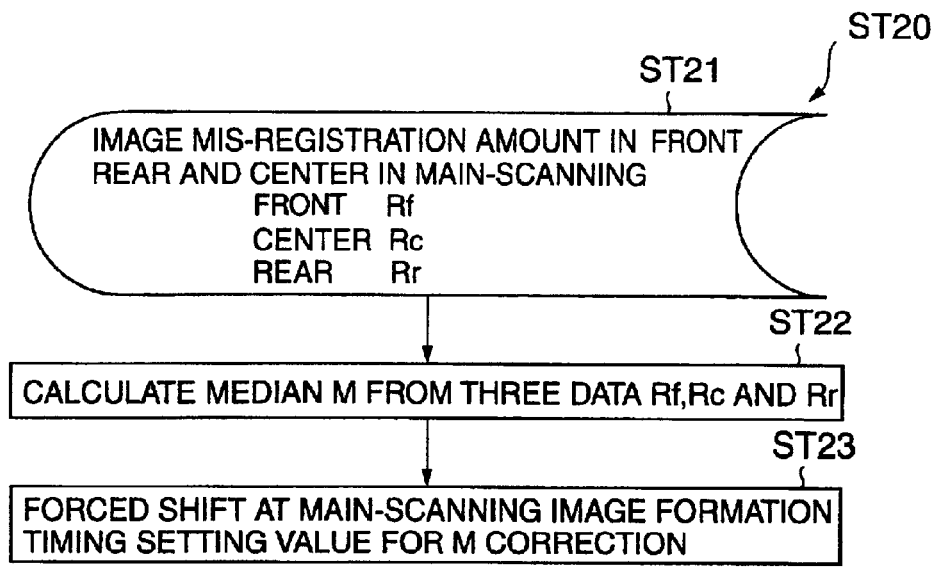
FIG. 17 is a flow chart explaining an operation in forced shifting of main-scanning position in image formation.

The image-forming main-scanning position forced-shifting sequence in FIG. 16 is separated into steps ST21 to ST23 in FIG. 17. Performed first in step ST21 is display of a window indicating amounts of mis-registration in front, rear and center in the main-scanning direction for forced shifting of main-scanning position. The median M of the three data displayed in step ST21 is calculated in step ST22. In step ST23, a setting value is obtained for setting image-forming timing in the main-scanning direction for correction by the median M calculated in step ST22 and forced shifting is executed in accordance with the setting value. The image forced-shifting in the main-scanning direction is then completed.

Figure 18:
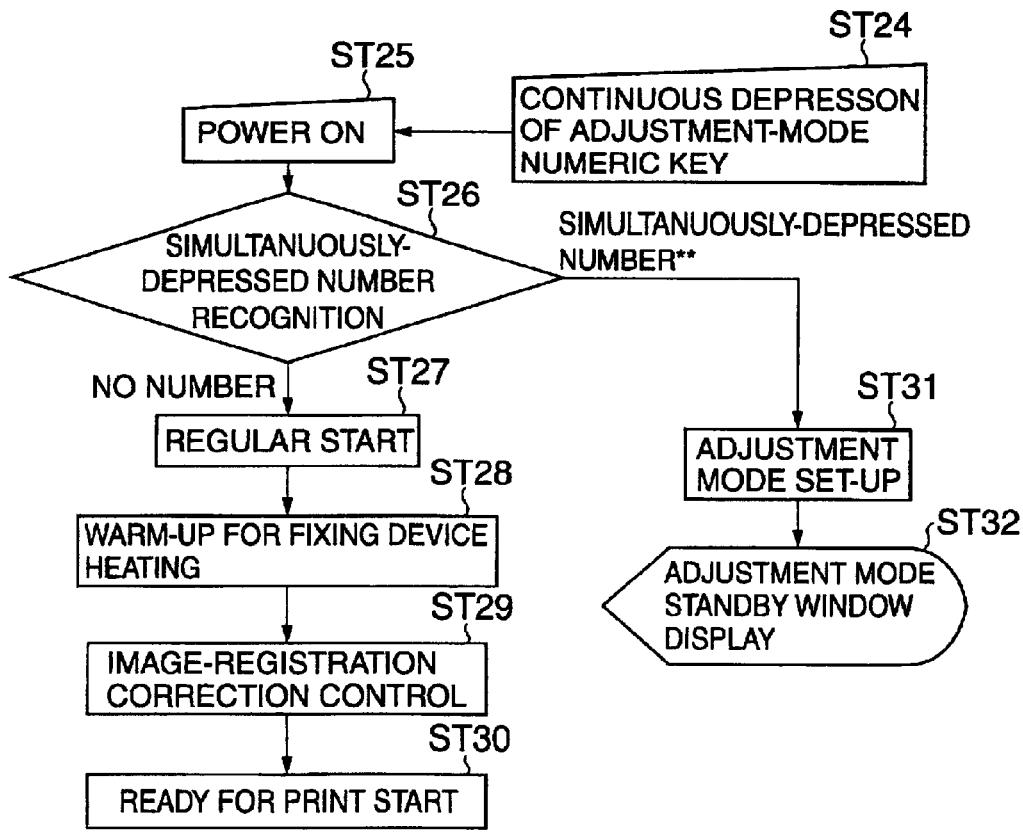
FIG. 18 is a flow chart explaining an operation in setting the image forming apparatus in reflecting mirror angle adjustment mode.

FIG. 18 shows a flow chart indicating a sequence of adjustment mode settings in the image forming apparatus. In FIG. 18, a numeric key for adjustment-mode code is continuously depressed in step ST24, thus power is on for the apparatus in step ST25. Determined in step ST26 is whether there are numbers depressed at the same time. If not, the sequence goes to step ST27 for a normal start. The fixing device is then heated in step ST28 for a warm-up. Executed next in step ST29 is an image-registration correction control. On completion of this control, the apparatus is set in a waiting mode under the correction in step ST30 until printing starts.

On the other hand, when it is determined that there are numbers depressed at the same time in step ST26, the sequence goes to step ST31 to set an adjustment mode and an adjustment-mode standby window is displayed in step ST32. Adjustment-mode settings in the image forming apparatus are performed as disclosed for correction of mis-registration in the standard system.

Figure 19:
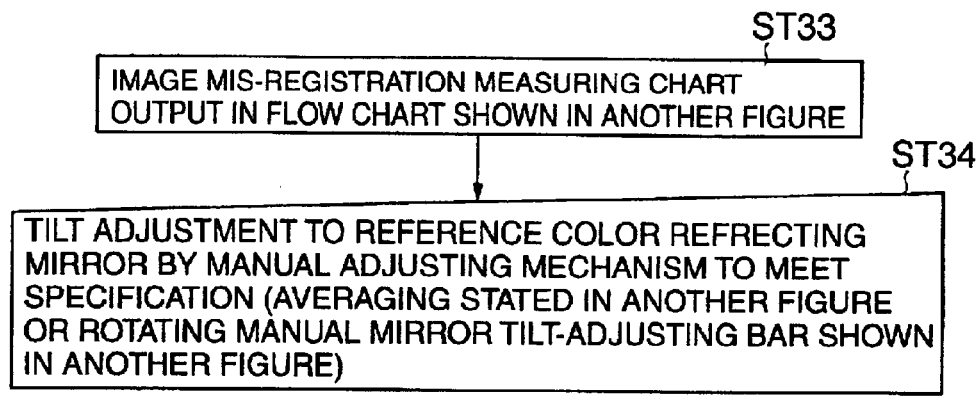
FIG. 19 is a flow chart explaining an operation in manual adjustments using image mis-registration adjustment chart.

FIG. 19 shows a flow chart of a sequence of manual correction of image mis-registration. In step ST33, a chart is printed out for measuring image mis-registration described in the foregoing flow chart. The operator adjusts a tilt of the mirror for reflecting the reference color shown in FIG. 2 to meet the specifications in step ST34. The mirror-tilt adjustments are performed with computation by averaging processing described before or the operator rotates the manual mirror-tilt adjustment bar shown in FIG. 2 to adjust an angle of the reflecting mirror 26B in the main-scanning direction.

Figure 20:
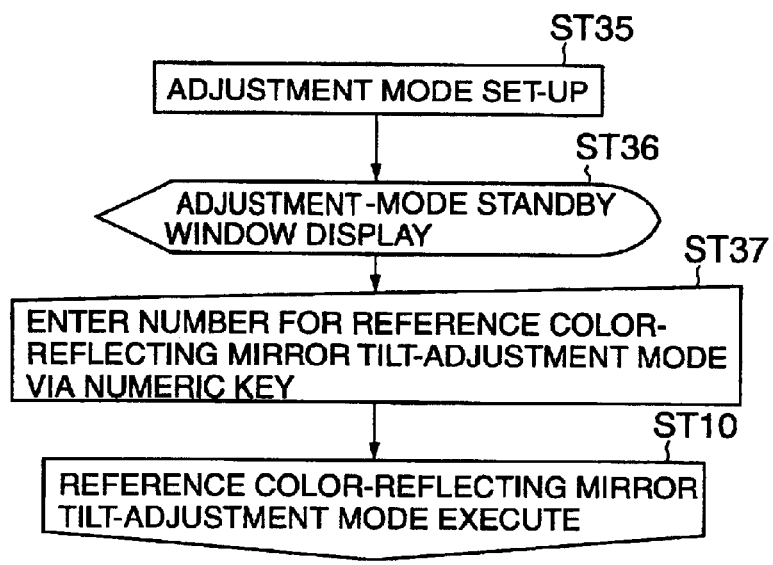
FIG. 20 is a flow chart explaining an operation in automatic adjustments using image mis-registration adjustment chart.

Shown in FIG. 20 is a flow chart of a sequence of automatic reflecting mirror adjustments by the automatic adjustment mechanism illustrated in FIG. 3. An adjustment mood is set in step ST35 for displaying an adjustment-mode standby window in step ST36. A number corresponding to a tilt-adjustment mode is entered in step ST37 for tilt adjustments to the reflecting mirror 26B for the reference color that is black here. Executed last in step ST10 is the adjustment mode to the reference color-reflecting mirror 26B. This mode is shown in the flow chart in FIG. 16 and hence the explanation thereof is omitted here.

Figure 21:
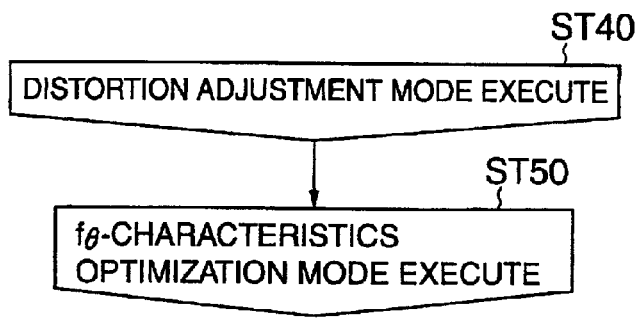
FIG. 21 is a flow chart explaining an operation in reference line-reflecting mirror angle adjustment mode.

The angle adjustment mode sequence to the reference color (black)-reflecting mirror 26B is disclosed with reference to FIG. 21. The sequence includes the step of an image distortion-adjustment mode execution sequence for correcting distortion as shown in step ST40 and the step of sequence for optimizing the fθ-characteristics defined as above as shown in step ST50. Step ST40 will be described in detail with reference to FIG. 22. Step ST50 will be described in detail with reference to FIGS. 23 and 24.

Figure 22:
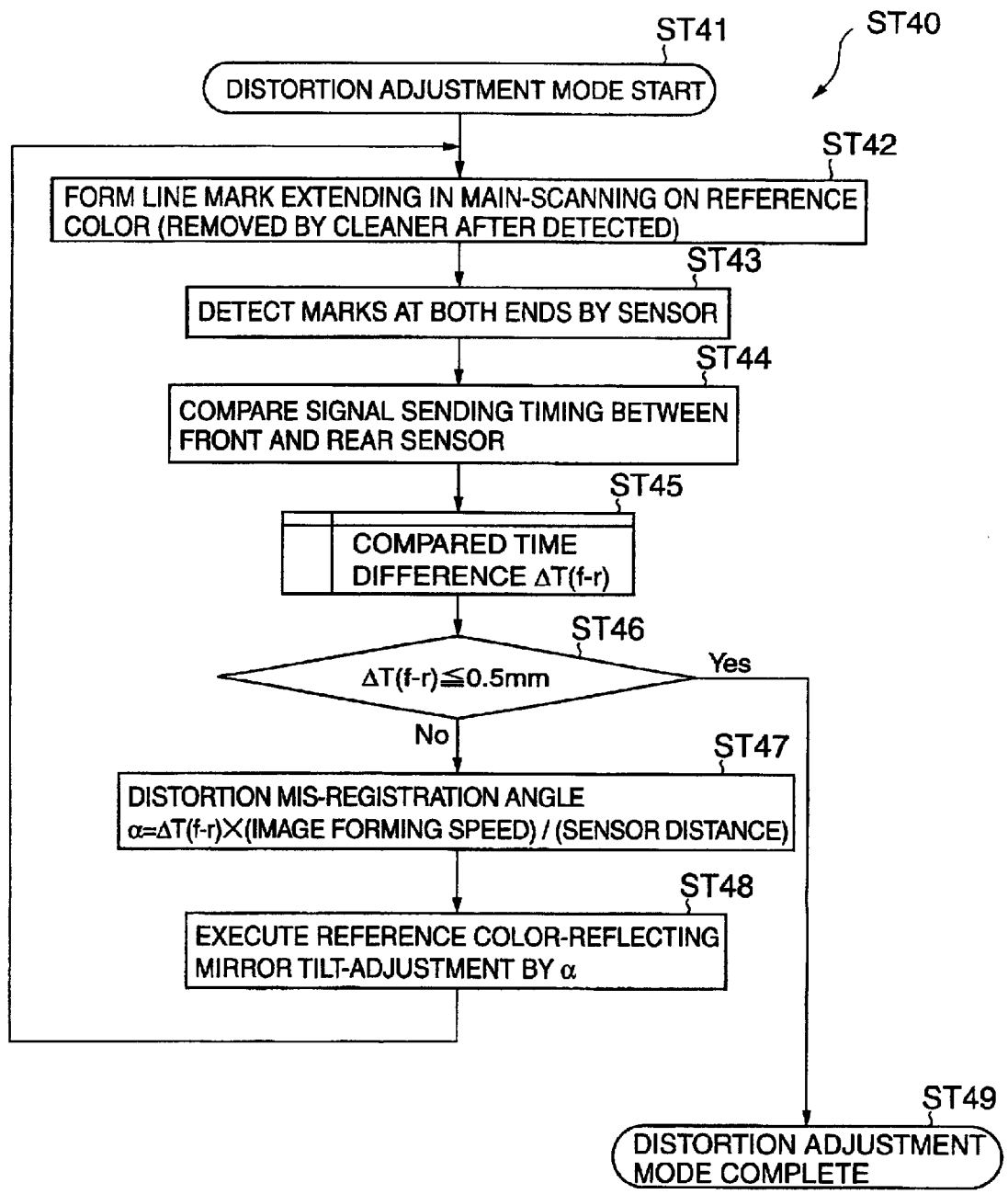
FIG. 22 is a flow chart explaining an operation in distortion adjustment mode.

FIG. 22 shows step ST40 for the distortion-adjustment mode executing sequence. This sequence is a control operation for distortion adjustments using marks having lines parallel to the main-scanning direction formed on both sides in the main-scanning direction such as shown in FIGS. 11 and 14. In FIG. 22, when a distortion-adjustment mode starts in step ST41, lines extending in the main-scanning direction for the reference color such as shown in FIG. 11 or a part of the marks formed at both ends shown in FIG. 14 are formed in step ST42. These marks will be removed by a cleaner, etc., after positional detection.

In step ST43, the marks formed on both sides in the main-scanning direction are detected by the sensors 31 and 32 or the sensors 44 and 45. Next, compared in step ST44 is a difference between timing in which a signal is detected by the front sensor 31 or 45 and that in which a signal is detected by the rear sensor 32 or 44. The timing comparison is expressed as the compared time difference $\Delta T(f-r)$ as shown in step ST45. When the compared time difference $\Delta T(f-r)$ does not lie in a range of error within 0.5 mm, the sequence goes to step ST47 to obtain an angle $\alpha$ of mis-positioning due to distortion as $\alpha=\Delta T(f-r)\times$(image-forming speed)/(distance between sensors).

When $\alpha$ is obtained in step ST47, tilt adjustments are made to the reference-color reflecting mirror 26B based on $\alpha$ in step ST48. This operation is repeated and when no angle of mis-positioning is detected, determination is made as within 0.5 mm in step ST46. The sequence goes to step ST49 to complete the distortion-adjustment mode.

Figure 23:
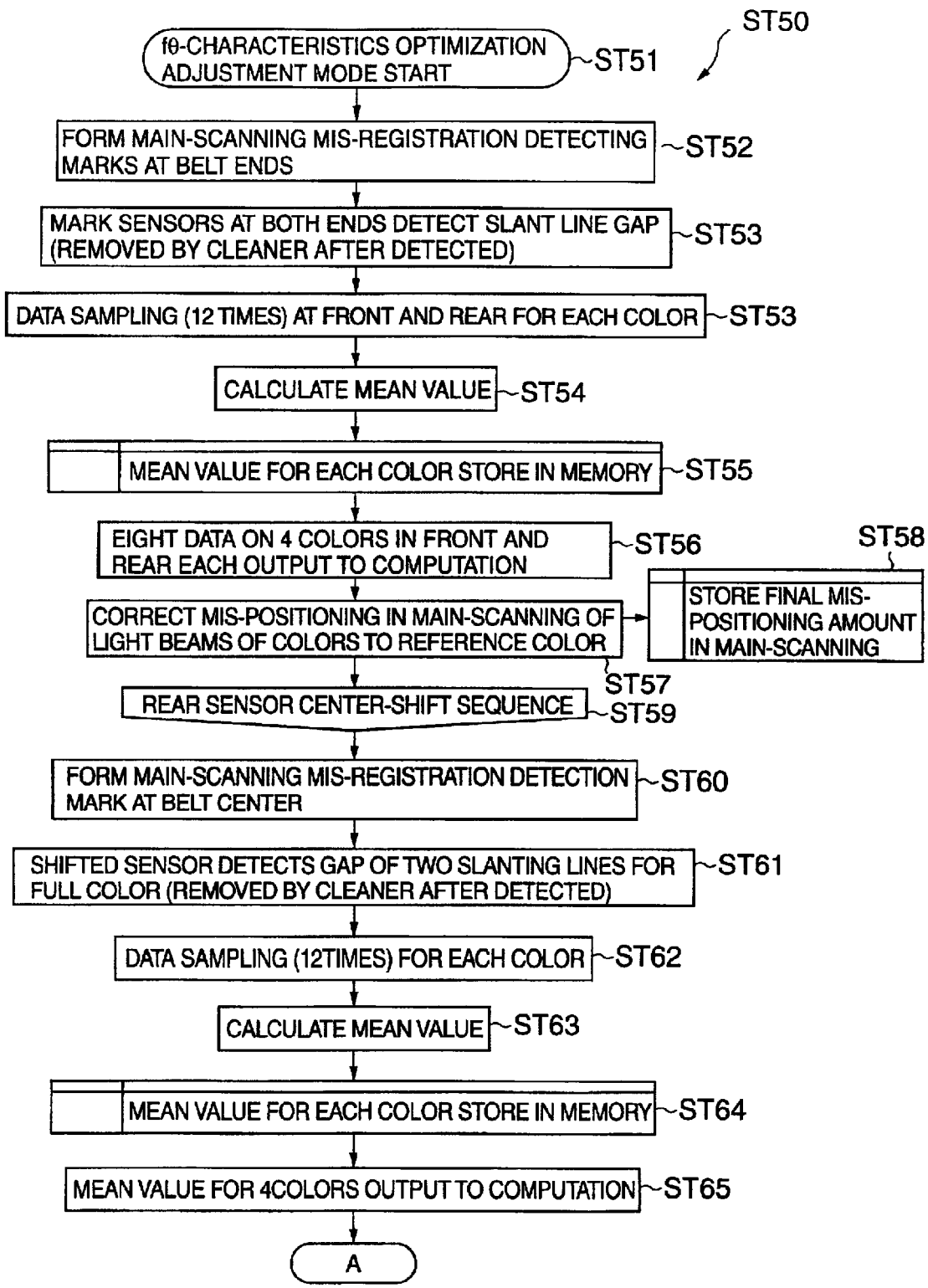
FIG. 23 is a flow chart explaining an operation in returning a sensor, one of two sensors acting as three sensors, from center to rear.
Figure 24:
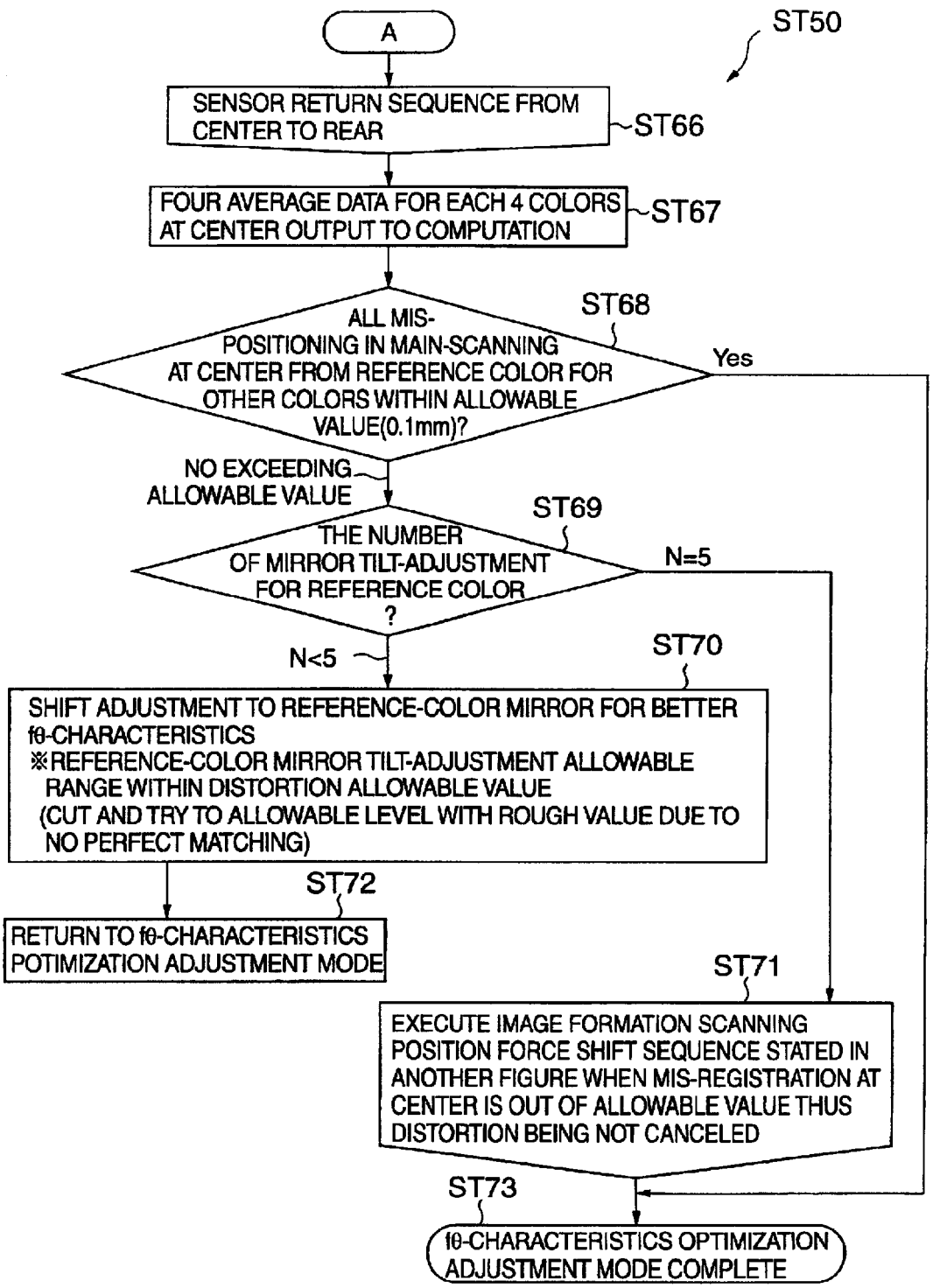
FIG. 24 is a flow chart explaining an operation in optimizing the fθ-characteristics indicating the linearity of light beams in the main-scanning direction.

Described next with reference to FIGS. 23 and 24 is adjustment mode for optimizing the fθ-characteristics. The optimization of the fθ-characteristics includes a sensor-shifting step of shifting a sensor functioning as a sensor at one end and also the center such as shown in FIGS. 13 and 14. The same optimization steps are also applied to the first sensors 31 and 32 at both ends and the center sensor 33 except the sensor-shifting step. The detection marks in this adjustment mode are marks such as shown in FIG. 12 formed like the character "V" having perpendicular lines each having the angle of 45 degrees to the dashed line parallel to the main-scanning direction.

In step ST50 of the adjustment mode for optimizing the fθ-characteristics, marks formed at both ends of the transfer belt 5 for detecting mis-positioning in main-scanning only in step ST52 following to the starting step ST51 are the detection marks 41 and 42. The two marks formed at both ends are detected by the sensors 31 and 32 or the sensors 44 and 45 in step ST53. The sensors at both ends detect the gap between the slanting lines. The formed detection marks will be removed by a cleaner, etc., after detected.

Detected values at the front side (32, 44) and the rear side (31, 45) for each color are sampled for 12 times for example. The sequence goes to step ST54 to calculate a mean value of the 12-time sampled values. The mean value for each color is stored in memory in step ST55. Eight mean value data at the front and rear sides each for 4 colors are computed and output in step ST56. To the light beam for the reference color, mis-positioning of light beams for the other colors is corrected in the main-scanning direction in step ST57. The correction is performed by the automatic correction mechanisms 14Y, 14M and 14C. The final amount of mis-positioning for each color in the main-scanning direction is stored in step ST58.

The second sensor 45 of the movable type shown in FIGS. 13 and 14 is shifted to the center in step ST59. The second sensor also functions as the rear end sensor, so that, as illustrated in FIG. 13, the rear second sensor 45 is shifted to the center. The mark 54 for center potion recognition is used for positioning the shifted second sensor 45 at the center.

In step ST60, the marks 43 for detecting mis-positioning in the main-scanning direction are formed on the middle section of the transfer belt 5 in the main-scanning direction. Simultaneously with this, marks 36 for detection of mis-positioning at both ends may be formed at both ends of the transfer belt. In step ST61, a gap between two slanting lines of each center mark 43 formed in full color is detected by the second sensor 45 shifted to the center. The marks 43 for center positioning detection will be removed by a cleaner, etc., after detected.

Each color data is sampled for 12 times, for example, in step ST62 and the mean value for the sampled data is calculated in step ST63. The calculation of the mean value is performed by the slant detector 12 shown in FIG. 1. The mean value for each color calculated in step ST63 is stored in memory. The stored mean values for four colors are output to an arithmetic unit in step ST65. The adjustment mode for optimizing the fθ-characteristics then proceeds to the sequence shown in FIG. 24 from FIG. 23.

In FIG. 24, executed in step ST66 is the sequence of shifting the movable-type second sensor 45 from the center to the rear side. The mean value data four in total for the four colors detected at the center are output to the arithmetic unit in step ST67. It is determined in next determining step ST68 whether or not, to the reference light beam of the reference color, all amounts of mis-positioning of the light beams of the other colors at the center in the main-scanning direction lie in an allowable value, for instance, in the range of 0.1 mm. If exceeding the allowable value in the determination step in ST68, the sequence goes to step ST69 to determine the number of adjustments to a slanting angle of the light beam-reflecting mirror 26B for the reference color, that is black here.

The sequence goes to step ST70, if the number of adjustments is less than five times, to adjust the mirror 26B for reflecting light beam of the reference color by the tilting mechanism such that the mirror is shifted in a direction for better fθ-characteristics. An allowable range of adjustments to the mirror for reflecting the light beam of the reference color lies in level of tolerance to distortion. Adjustments are made by cut and try using approximate values until reaching the tolerance level. The sequence goes to step ST72 to perform optimization of the fθ-characteristics and returns to step ST51 for starting the adjustment mode.

When it is determined in step ST69 that the number of adjustments to the reference light beam-reflecting mirror 36B is five times, it is further determined that the amount of mis-positioning at the center will not lie in the tolerance level so that correction of distortion is impossible. The sequence thus proceeds to the forced main-scanning position shifting sequence in image formation as shown in FIG. 17. The fθ-characteristics optimization mode is then completed in step ST73. When it is determined in the determination block in step ST68 that, to the reference light beam, all amounts of mis-positioning of light beams of the other colors at the center lie within the tolerance such as 0.1 mm, the adjustment mode is also completed in step ST73 because of no necessity of fθ-characteristics optimization. The fθ-characteristics optimization adjustment mode sequence is completed accordingly.

Disclosed lastly is a shift sequence for the movable-type second sensor 45. The shift sequence for the second sensor 45 includes a sequence of shifting the sensor 45 from the rear to the center side in step ST59 in FIG. 23 and a sequence of shifting the sensor 45 from the center to the rear side in step ST66 in FIG. 24. The former and the latter sequences are disclosed with respect to FIGS. 25 and 26, respectively.

Figure 25:
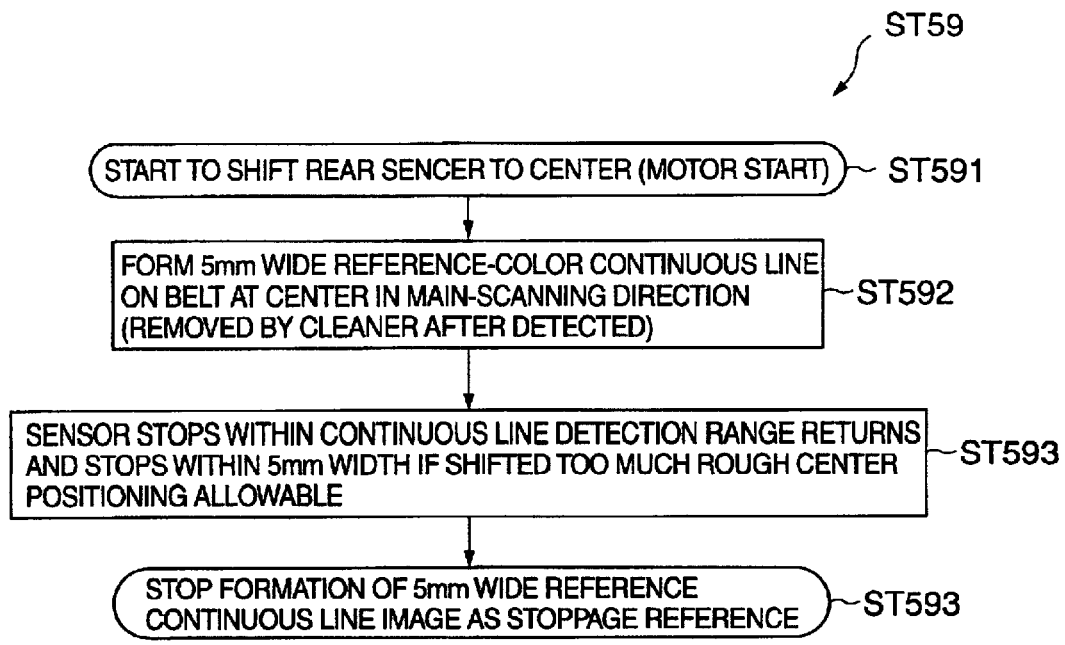
FIG. 25 is a flow chart explaining an operation in shifting a sensor, one of two sensors acting as three sensors, from rear to center.

In FIG. 25, the motor 47 starts in step ST591 to shift the second sensor 45 located at the rear side to the center. In detail, as illustrated in FIGS. 13 and 14, as the second sensor being always pulled toward the center by the spring 49, it is easily shifted to the center by applying a weak power to the motor 47 to rotate in the reverse direction with a pulling force of the spring 49. Next, in step ST592, the center detection mark 54 is formed at the center of the transfer belt 5. The detection mark 54 is formed as extending straight on the transfer belt 5 in the sub-scanning direction, with about 5 mm in width. The detection mark 54 will be removed by a cleaner, etc., after detected.

The movable-type second sensor 45 stops at a position within a continuous line detection range in step ST593. The second sensor 45 will be shifted back to the rear side when it has been shifted too much and stopped at a position within a range corresponding to the range of 5 mm that is the width of the detection mark 54. It is rough compared to the positioning at the sides because positioning at the center is not necessary be precise. Lastly, in step ST594, when an image of 5 mm-wide continuous line (stoppage reference) is formed, the second sensor 45 is positioned and stopped there. The sequence is followed by the control after step ST60 in FIG. 23.

Figure 26:
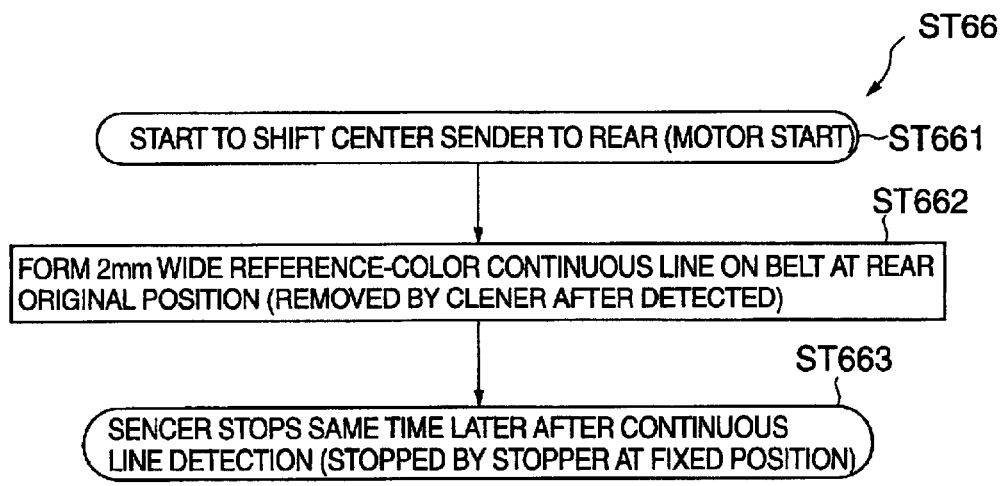
FIG. 26 is a flow chart explaining an operation in shifting a sensor, one of two sensors acting as three sensors, from center to rear.

Disclosed next with reference to FIG. 26 is the sequence of shifting the second sensor 45 from the center to the rear side. In step ST66 (FIG. 24), the motor starts in step ST661 in FIG. 26 so that the second sensor 45 located at the center is shifted to the rear side against the pulling force of the spring 49. The detection mark 53 for positional detection is formed at the rear end of the transfer belt 5 in step ST662. The mark 53 is formed in straight but narrower than the center detection mark 54 because positioning at the end requires accuracy higher than the center.

In detail, the end mark 53 is formed in 2 mm-width compared to 5 mm-width for the center mark 54. The continuous line for the reference light beam formed on the transfer belt 5 will be removed by a cleaner. Next, in step ST663, the movable-type second sensor 45 stops some time later after the detection of the continuous line. The second sensor stops at a position by a stopper 50.

It is further understood by those skilled in the art that the several control operations disclosed with reference to FIGS. 15 to 26 are preferred embodiments of the present invention and that the registration correction, the fθ-characteristics optimization, etc., may be made by other control sequences.

What is claimed is:

1. An image forming apparatus having functions of tilt adjustments to a mirror for reflecting a laser beam and outputting an image after registration of a plurality of images, the apparatus comprising:

a laser source for generating laser beams;

a plurality of mirrors for reflecting a plurality of light beams including at least one reference beam for forming the images based on the laser beams generated by the laser source;

image forming means for forming the images for each of the light beams;

image transfer means for storing the images formed by the image forming means and transferring the stored images in a predetermined sub-scanning direction;

inclination detecting means for detecting inclinations of the images stored by the image transfer means in a main-scanning direction in relation to the sub-scanning direction at least on the reference beam; and inclination correcting means for correcting the inclinations detected by the inclination detecting means on the reference beam in the main-scanning direction by adjusting a relative angle of the mirror for reflecting the reference beam in the main-scanning direction.

2. The image forming apparatus according to claim 1, wherein the inclination detecting means detects inclinations of the light beams other than the reference beam in the main-scanning direction in addition to the detection of the inclinations of the reference beam in the main-scanning direction, and the inclination correcting means corrects the inclinations of the images in the main-scanning direction formed by the light beams other than the reference beam by adjusting relative angles of mirror for reflecting the light beams other than the reference beam in the main-scanning direction.

3. The image forming apparatus according to claim 2, wherein the inclination detecting means includes a plurality of detectors provided as being apart from each other by a predetermined distance within an allowable scanning range in a scanning direction of the light beams for detecting the inclinations of the reference beam and the light beams other than the reference beam in the main-scanning direction, and the inclination correcting means converts the inclinations in the scanning direction in relation to the sub-scanning direction into signal values based on virtual straight lines for determination that connect a plurality of positions detected by the detectors, and compares the detected signal values with a reference signal value predetermined based on a main-scanning light beam orthogonal to the sub-scanning direction, thus not making correction when signal differences lie in an allowable range whereas making correction when the signal differences exceed the allowable range.

4. The image forming apparatus according to claim 3, wherein
the image forming means forms predetermined marks at positions at least detectable by the detectors in the images stored in the image transfer means,
the detectors of the inclination detecting means detect the marks formed at the predetermined positions in the images for detection of the detectable positions, and
the inclination correcting means forms the virtual straight lines for determination by connecting the detected positions and performs the comparison as to whether or not the inclinations lie in the allowable range for correction of the inclinations.

5. The image forming apparatus according to claim 2, wherein
the inclination correcting means has a function of preventing decrease in fθ-characteristics indicating linearity of a position at which scanning light beams are converged within an allowable scanning range, the decrease occurring based on the correction of the inclinations of the light beams in the main-scanning direction,
the inclination detecting means has an error detector for detecting an error of the fθ-characteristics by using detected amounts of image mis-positioning, and
the inclination correcting means has a calculating section for calculating a feed-back amount for correction based on the error of the fθ-characteristics detected by the error detector and an adjusting section, responsive to the feed-back amount for correction calculated by the calculating section, for adjusting the amounts of image mis-positioning detected based on the error of the fθ-characteristics.

6. The image forming apparatus according to claim 5, wherein
the calculating section calculates the feed-back amount for correction to correct perpendicularity in the main-scanning direction in relation to the sub-scanning direction, incorrect perpendicularity being a cause of occurrence of a big error to the fθ-characteristics, and
the adjusting section adjusts a slant of the reflecting mirror in the main-scanning direction based on the feed-back amount for correction while applying correction of the error of the fθ-characteristics.

7. The image forming apparatus according to claim 5, wherein
the inclination detecting means includes a plurality of detectors provided as being apart from each other by a predetermined distance within an allowable scanning range in a scanning direction of the light beams for detecting the inclinations of the reference beam and the light beams other than the reference beam in the main-scanning direction, the detectors having an error detecting function of detecting an error of the fθ-characteristics by using detected amounts of image mis-positioning, and
the inclination correcting means has a calculating section for calculating a feed-back amount for correction based on the error of the fθ-characteristics detected by the error detector, an adjusting section, responsive to the feed-back amount for correction calculated by the calculating section, for adjusting the amounts of image mis-positioning detected based on the error of the fθ-characteristics in an allowable range, a signal converter for converting the inclinations in the scanning direction in relation to the sub-scanning direction into signal values based on virtual straight lines for determination that connect a plurality of positions detected by the detectors, a comparing section for comparing the detected signal values with a reference signal value predetermined based on a main-scanning light beam orthogonal to the sub-scanning direction and an adjusting section for correcting the inclination so that differences in the signals lie in the allowable range.

8. The image forming apparatus according to claim 5, wherein
the inclination detecting means includes a plurality of detectors provided as being apart from each other by a predetermined distance within an allowable scanning range in a scanning direction of the light beams for detecting the inclinations of the reference beam ans the light beams other than the reference beam in the main-scanning direction, the detectors having an error detecting function of detecting an error of the fθ-characteristics by using detected amounts of image mis-positioning, and
the calculating section of the inclination correcting means accepts the error of the fθ-characteristics as image mis-registration in the main-scanning direction detected by the detectors as a plurality of detected values and performs averaging processing such that absolute values of the accepted detected values are averaged so that the absolute values of amounts of mis-registration lie in the allowable range.

9. The image forming apparatus according to claim 1, wherein the inclination correcting means includes
a first correction amount calculator for calculating the slant of the mirror for reflecting the reference beam in the main-scanning direction in relation to the sub-scanning direction based on a target value in the sub-scanning direction and outputting a correction value for the calculated slant as a correction control signal, and
a first adjuster provided at one end of each mirror, the other end thereof being rotatably supported, for adjusting each mirror to rotate so that perpendicularity of each mirror in the main-scanning direction in relation to the sub-scanning direction is maintained based on the correction control signal from the correction amount calculator.

10. The image forming apparatus according to claim 9, wherein the first adjuster is made up of manual adjusting means, attached to the mirror for reflecting the reference beam, for manually adjusting an angle of the mirror for reflecting the reference beam to be supported.

11. The image forming apparatus according to claim 9, wherein the first adjuster is made up of automatic adjusting means, attached to the mirror for reflecting the reference beam, for automatically adjusting an angle of the mirror for reflecting the reference beam to be supported based on pre-detected amount to be adjusted.

12. The image forming apparatus according to claim 9, wherein the first adjuster adjusts the reference beam by adjusting one of the mirrors provided as most distant from a laser generator or a polygon mirror as the laser source.

13. The image forming apparatus according to claim 9, wherein the inclination correcting means includes
a plurality of second correction amount calculators each for calculating a slant of each mirror for reflecting the light beam other then the reference beam in the main-scanning direction in relation to the reference beam detected by the inclination detecting means based on a detected value of the reference beam and outputting a correction value for the calculated slant as a correction control signal, and a plurality of second adjusters each provided at one end of each mirror, the other end thereof being rotatably supported, for adjusting each mirror to rotate so that perpendicularity of each mirror in the main-scanning direction in relation to the sub-scanning direction is maintained based on the correction control signal from the correction amount calculator.

14. The image forming apparatus according to claim 13, wherein each second adjuster periodically adjusts the inclination of each light beams other than the reference beam in a predetermined timing after power in on, and the first adjuster adjusts the inclination of the reference beam during a regular maintenance including change of photosensitive drams, which an interval between periodical adjustments made by the first adjuster being longer in time than the periodical adjustments made by each second adjuster.

15. The image forming apparatus according to claim 1, wherein the inclination detecting means is made up of self-printing means as pre-installed specific pattern images composed of blocks and grids and for printing the pattern images for visual inspection.

16. The image forming apparatus according to claim 15, wherein each specific pattern image as the self-printing means is a pattern of grid of lines crossing vertically and horizontally and having scale marks formed with a specific color and distant from each other by a predetermined gap on lines connecting crossing points to be detected on the grid, for recognizing mis-positioning in the main and sub-scanning directions by checking the scale marks.

17. The image forming apparatus according to claim 15, wherein each specific pattern image as the self-printing means is composed of a first line that lies in a first direction in the main or sub-scanning direction according a reference color, a second line that lies in a second direction perpendicular to the first line, a third line of another color that crosses with the first and the second lines at an acute angle, and a plurality of fourth lines of reference color parallel to the second line and formed with a predetermined gap, lines as the third line of the other color being formed as shifted from the first and the second lines when image mis-registration occurs, the shifting being expressed with enlargement as shifting in the second direction in accordance with shifting in the first direction, the shifting in the first direction being detectable according to the number of lines shifted from the first line in the first line as a reference and in the vicinity of the crossing with the second line in the second direction.

18. The image forming apparatus according to claim 1, wherein the inclination detection means includes an end mis-positioning sensor provided at both ends in the main-scanning direction and a center mis-positioning sensor provided in the center in the main-scanning direction.

19. The image forming apparatus according to claim 18, wherein the end mis-positioning sensor includes a plurality of first sensors fixed at the both ends in the main-scanning direction for detecting mis-positioning of images at the both ends in the main-scanning direction and a second sensor provided in the center in the in the main-scanning direction for detecting mis-positioning of an image at the center in the main-scanning direction.

20. The image forming apparatus according to claim 18, wherein the end mis-positioning sensor includes a first sensor fixed at one end in the main-scanning direction for detecting mis-positioning of an image at the one end in the main-scanning direction and a second sensor provided as movable between another end and the center both in the main-scanning direction for detecting mis-positioning of an image between the other end and the center in the main-scanning direction.

21. The image forming apparatus according to claim 20, wherein the second sensor includes a detecting section for detecting an image pattern reflected from an object image, a drive section on which the detecting section is mounted for moving the detecting section in the main-scanning direction and a positioning section for setting detection of the detecting section in accordance with a first fixed point at the other end in the main-scanning direction and a second fixed point at the center in the main-scanning direction.

22. The image forming apparatus according to claim 20 further comprising:

forming means for forming marks used for detecting mis-positioning in the main-scanning direction; and detecting means for detecting the marks and obtaining an amount of mis-positioning according to a sequence different from regular correction control, wherein the forming and the detecting means are provided in addition to a regular correction controller for correcting mis-positioning in both the main and the sub-scanning directions.

* * * * *